US012718479B2

(12) United States Patent
Wang

(10) Patent No.: US 12,718,479 B2
(45) Date of Patent: Aug. 25, 2026

(54) VIRTUAL SCENE SEGMENTATION AND PARALLEL LOADING

(71) Applicant: Tencent Technology (Shenzhen) Company Limited, Shenzhen (CN)

(72) Inventor: Yachang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 50 days.

(21) Appl. No.: 18/666,675

(22) Filed: May 16, 2024

(65) Prior Publication Data

US 2024/0303920 A1 Sep. 12, 2024

Related U.S. Application Data

(63) Continuation of application No. PCT/CN2023/119516, filed on Sep. 18, 2023.

(30) Foreign Application Priority Data

Oct. 14, 2022 (CN) ........................ 202211258802.3

(51) Int. Cl.
*G06T 17/00* (2006.01)
*G06T 7/11* (2017.01)

(52) U.S. Cl.
CPC ................ *G06T 17/00* (2013.01); *G06T 7/11* (2017.01); *G06T 2210/21* (2013.01)

(58) Field of Classification Search
CPC . G06F 9/50; G06F 9/445; G06F 3/011; G06F 9/48; A63F 13/35; A63F 13/30;
(Continued)

(56) References Cited

U.S. PATENT DOCUMENTS

2016/0358312 A1* 12/2016 Kolb, V .................... G06T 5/73
2017/0257410 A1* 9/2017 Gattis .............. H04N 21/26258
(Continued)

FOREIGN PATENT DOCUMENTS

CN 108111604 A * 6/2018 ............. H04L 67/60
CN 114726913 A * 7/2022 ........... H04L 41/145

OTHER PUBLICATIONS

Qin X, Fan DP, Huang C, Diagne C, Zhang Z, Sant'Anna AC, Suarez A, Jagersand M, Shao L. Boundary-aware segmentation network for mobile and web applications. arXiv preprint arXiv:2101.04704. Jan. 12, 2021.*

(Continued)

*Primary Examiner* — Phu K Nguyen
(74) *Attorney, Agent, or Firm* — ARENTFOX SCHIFF LLP

(57) ABSTRACT

A method includes segmenting a virtual scene into virtual plots and allocating each virtual plot respectively to each of scene devices in response to start-up messages transmitted by the scene devices. The method further includes transmitting a first loading message to two or more scene devices of the plural scene devices. The first loading message instructs the two or more scene devices to load in parallel, into respective memories of the two or more scene devices, plot data files of virtual plots respectively allocated to each of the two or more scene devices. The method further includes transmitting loading configuration information to a service device configured to respond to operation requests from a terminal device displaying the virtual scene, the loading configuration information indicating a scene device to which each virtual plot is allocated.

20 Claims, 12 Drawing Sheets

(58) Field of Classification Search
CPC . A63F 13/52; G06T 7/11; G06T 19/00; G06T 17/00; G06T 2210/52; G06T 2210/21; H04L 67/131
USPC .......................................................... 345/418
See application file for complete search history.

(56) References Cited

U.S. PATENT DOCUMENTS

2019/0355153 A1* 11/2019 Singh .................... G06F 16/745
2021/0133929 A1* 5/2021 Ackerson .............. G06T 3/4092
2022/0095001 A1* 3/2022 Harviainen ........ H04N 21/2662
2022/0366683 A1* 11/2022 Pereg ..................... G06V 10/25
2022/0417305 A1* 12/2022 Chandrashekar ............................ H04N 21/44209
2023/0026014 A1* 1/2023 Brandt ............... H04N 21/6587

OTHER PUBLICATIONS

Zhang L, Sun A, Shea R, Liu J, Zhang M. Rendering multi-party mobile augmented reality from edge. InProceedings of the 29th ACM Workshop on Network and Operating Systems Support for Digital Audio and Video Jun. 2, 20191 (pp. 67-72).*
International Search Report and Written Opinion received for PCT Patent Application No. PCT/CN2023/119516, mailed on Nov. 9, 2023, 11 pages (5 pages of English Translation and 6 pages of Original Document).

* cited by examiner

Interface 9-1

Interface 9-2

VIRTUAL SCENE SEGMENTATION AND PARALLEL LOADING

RELATED APPLICATIONS

The disclosure is a continuation of International Patent Application No. PCT/CN2023/119516, filed on Sep. 18, 2023, which is based on Chinese patent application No. 202211258802.3, filed on Oct. 14, 2022. The disclosures of the prior applications are hereby incorporated by reference in their entirety.

FIELD OF THE TECHNOLOGY

The disclosure relates to cloud technologies, including a method and system for processing a virtual scene, a device, a computer-readable storage medium, and a computer program product.

BACKGROUND OF THE DISCLOSURE

Virtual scenes, which provide users with rich visual elements, have been applied to a wide range of game applications. Furthermore, higher requirements are imposed on the virtual scenes on account of increasing playing methods of the game applications. The game applications are required to implement logical processing during games in scene devices in cloud. Accordingly, the scene devices are required to possess a thorough knowledge of landscape data of the virtual scenes.

However, since some virtual scenes are large-sized, high memory overhead will be occupied to process (for example, load or run) the virtual scenes. In addition, loading and collision detection are also time-consuming. That is, when the virtual scenes are processed, the memory overhead is high and processing efficiency is low.

SUMMARY

Aspects of the disclosure provide a method and system for processing a virtual scene, a device, a computer-readable storage medium, and a computer program product, which can effectively reduce memory overhead when the virtual scene is processed and improve processing efficiency of the virtual scene.

In an aspect, a method for processing a virtual scene includes segmenting a virtual scene into plural virtual plots and allocating each virtual plot respectively to each of plural scene devices in response to start-up messages transmitted by the plural scene devices. The method further includes transmitting a first loading message to two or more scene devices of the plural scene devices. The first loading message instructs the two or more scene devices to load in parallel, into respective memories of the two or more scene devices, plot data files of virtual plots respectively allocated to each of the two or more scene devices. The method further includes transmitting loading configuration information to a service device configured to respond to operation requests from a terminal device displaying the virtual scene, the loading configuration information indicating a scene device to which each virtual plot is allocated to enable the service device to determine a scene device allocated to a virtual plot included in an operation request from the terminal device and transmit, based on the operation request, a scene request to the scene device allocated to the virtual plot included in the operation request.

In an aspect, an apparatus for processing a virtual scene includes processing circuitry configured to segment a virtual scene into plural virtual plots and allocate each virtual plot respectively to each of plural scene devices in response to start-up messages transmitted by the plural scene devices. The processing circuitry is further configured to transmit a first loading message to two or more scene devices of the plural scene devices. The first loading message instructs the two or more scene devices to load in parallel, into respective memories of the two or more scene devices, plot data files of virtual plots respectively allocated to each of the two or more scene devices. The processing circuitry is further configured to transmit loading configuration information to a service device configured to respond to operation requests from a terminal device displaying the virtual scene, the loading configuration information indicating a scene device to which each virtual plot is allocated to enable the service device to determine a scene device allocated to a virtual plot included in an operation request from the terminal device and transmit, based on the operation request, a scene request to the scene device allocated to the virtual plot included in the operation request.

In an aspect, a non-transitory computer-readable storage medium stores computer-readable instructions, which, when executed by processing circuitry, cause the processing circuitry to perform a method for processing a virtual scene, the method including segmenting a virtual scene into plural virtual plots and allocating each virtual plot respectively to each of plural scene devices in response to start-up messages transmitted by the plural scene devices. The method further includes transmitting a first loading message to two or more scene devices of the plural scene devices. The first loading message instructs the two or more scene devices to load in parallel, into respective memories of the two or more scene devices, plot data files of virtual plots respectively allocated to each of the two or more scene devices. The method further includes transmitting loading configuration information to a service device configured to respond to operation requests from a terminal device displaying the virtual scene, the loading configuration information indicating a scene device to which each virtual plot is allocated to enable the service device to determine a scene device allocated to a virtual plot included in an operation request from the terminal device and transmit, based on the operation request, a scene request to the scene device allocated to the virtual plot included in the operation request.

A management device allocates a plurality of virtual plots obtained by segmenting a virtual scene to a plurality of scene devices. Each scene device is asked, by means of a first loading message, to load a to-be-loaded virtual plot. By transmitting loading configuration information to a service device, the service device can find, based on the loading configuration information, a corresponding scene device from the plurality of scene devices running in parallel, so as to carry out scene processing. Since a map range of the virtual plot is much less than a map range of the entire virtual scene and a quantity of objects included in the virtual plot is less than a quantity of objects of the entire virtual scene, by segmenting the virtual scene into a plurality of virtual plots and loading the plurality of virtual plots in parallel by means of a plurality of scene devices, each scene device can manage the virtual plot with high management efficiency by only requiring less memory overhead. Finally, memory overhead when the scene devices process the virtual scenes is effectively reduced and processing efficiency of the virtual scenes is improved.

DETAILED DESCRIPTION

Figure 1:
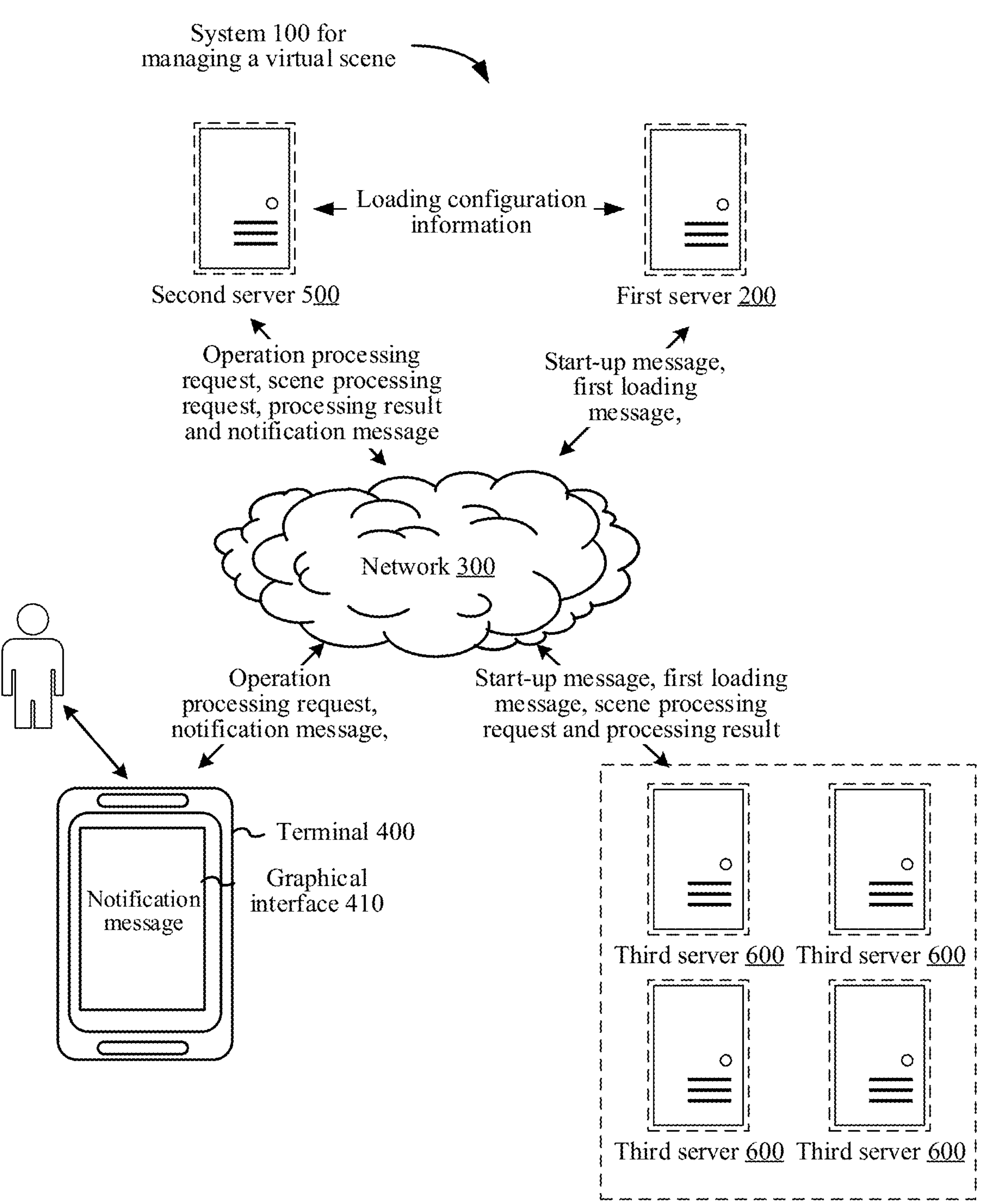
FIG. 1 is a schematic architectural diagram of a system for processing a virtual scene according to an aspect of the disclosure.

In order to make the objectives, technical solutions and advantages of the disclosure clearer, the disclosure will be described in further detail in combination with accompanying drawings. The described aspects are not to be considered as a limitation on the disclosure. All other aspects obtained by those of ordinary skill in the art shall fall within the scope of protection of the disclosure.

The expression "some aspects" involved in the following descriptions describes subsets of all possible aspects. However, "some aspects" can be the same subset or different subsets of all the possible aspects and can be combined with each other without conflict.

The term "first/second/third" involved in the following descriptions is merely used to distinguish between similar objects and does not denote specific order of objects. Specific order or sequence of the term "first/second/third" can be interchanged where permitted such that the aspects of the disclosure described herein can be implemented in order other than that illustrated or described herein.

Unless otherwise defined, all technical and scientific terms used herein have the same meanings as those commonly understood by those skilled in the technical field of the disclosure. The terms used herein are merely for the purpose of describing aspects of the disclosure and not intended to limit the disclosure.

Before the aspects of the disclosure are further described in detail, nouns and terms involved in the aspects of the disclosure are described. The nouns and terms involved in the aspects of the disclosure are suitable for the following explanations.

1) The phrase "in response to" is used to introduce a condition or state on which an executed operation is relied upon. One or more executed operations may be executed in real-time or with a set delay when the relied upon condition or state is satisfied. The executed operations are not limited to order, unless specifically stated.
2) A virtual scene is displayed (or provided) by an application when the application runs on a terminal. The virtual scene may be a simulated environment of the real world, a semi-simulated semi-fictitious virtual environment, or a purely-fictitious virtual environment. The virtual scene may be any one of a two-dimensional virtual scene, a 2.5-dimensional virtual scene, or a three-dimensional virtual scene. A dimension of the virtual scene is not limited in an aspect of the disclosure. For example, the virtual scene may include a sky, a land, an ocean, a virtual object, etc. The land may include environmental elements such as a desert, a city and a mountain. A user may control the virtual object to move in the virtual scene.
3) The virtual object is a feature of various persons and things that can carry out interaction in the virtual scene, or a movable object in the virtual scene. The movable object may be a virtual person, a virtual animal, or a cartoon person, etc. For example, the movable object may be a person, an animal, a plant or a stone, etc. displayed in the virtual scene. The virtual object may be a virtual feature used to represent a user in the virtual scene. A plurality of virtual objects may be included in the virtual scene. Each virtual object has its own shape and size in the virtual scene, which occupies part of a space of the virtual scene.
4) A seamless map refers to a technology of establishing a grand virtual scene for a user by means of a device cluster established by a plurality of scene devices. Since a size of a map and a quantity of users that can be carried by a single scene device are limited, it is required to establish a cluster by means of a plurality of scene devices. When a user controls the virtual object to move from one end of the map to the other end, it is required to span a plurality of scene devices without perception in usage experience. In this way, the user can carry out exploration on a map in larger scale.
5) The scene device refers to a proprietary device configured for view management and movement synchronization of the virtual scene. When the virtual scene is a game scene in a turn-based game or instant-based game, data such as animations and skills of a user may be additionally synchronized.
6) A voxel, short for a volume element, is the smallest representation unit of digital data and three-dimensional space.
7) A static mesh is a geometric body composed of a plurality of static polygons and can be used as an establishment unit of a basic scene in the virtual scene. In addition to being configured to establish the basic scene, the static mesh can also be configured to establish a movement object (such as a door or an elevator), a rigid physical object, a plant, a terrain decoration, a game target, and some other visual elements in a virtual scene.
8) A landscape refers to a foundational earth surface in the virtual scene, such as grass, a mountain, a river or a road in the virtual scene.

Virtual scenes, which provide users with rich visual elements, have been applied to a wide range of game applications. Furthermore, higher requirements are imposed on the virtual scenes on account of increasing playing methods of the game applications. For example, in massive multilayer online, the virtual scene has small scale, for example, 600×600 meters, and low complexity. However, in an open world game (also referred to as a roaming game, in which a user can freely roam in the virtual scene and choose a time point and way of a game character, and can more freely interact with the virtual scene, for example, establish a house, pick fruit and cook), the virtual scene has a more complex height space and is tightly combined with a game playing method. For example, a plurality of layers of caves, rotating stairs and staggered layers of corridor bridges exist in the virtual scene, such that the virtual scene is more realistic. For example, planes having different heights are located at the same horizontal coordinate. A user is required to be located on the right plane to acquire an object and attack a wild monster. For another example, when the user hides behind a rock or tree, it is required to run a more accurate radiographic testing technology in the virtual scene. For yet another example, planes having different heights will match different temperature control such that a life value of the virtual object controlled by the user can be affected, etc.

The game applications are required to implement logical processing during games in scene devices in cloud. Accordingly, the scene devices are required to possess a thorough knowledge of landscape data of the virtual scenes. In the related art, a landscape data file of a virtual scene is first generated based on a voxel and loaded by the scene device, such that the virtual scene is processed. However, since virtual scenes in some game applications are large-sized, for example, may have areas reaching 50 square kilometers to 100 square kilometers, high memory overhead will be occupied to process the virtual scenes. In addition, management such as loading and collision detection are also time-consuming. That is, when the virtual scenes are processed, the memory overhead is high and processing efficiency is low.

Moreover, to improve a visual effect and playing experience, a rich landscape and some objects that have complex structures and concentrated collision information, such as a low bush and a tall tree are generally set for the virtual scene. However, if these scene elements are generated with a high degree of accuracy, a storage space occupied by the landscape data file will be drastically increased (in a squared increasing mode). If these scene elements are generated with a low degree of accuracy, accuracy of collision detection, etc. will be negatively affected.

Aspects of the disclosure provide a method and system for processing a virtual scene, a device, a computer-readable storage medium, and a computer program product, which can effectively reduce memory overhead when the virtual scene is processed and improve processing efficiency of the virtual scene. An illustrative application of a system for processing a virtual scene, and a management device, a scene device and a service device in the system for processing a virtual scene provided in aspects of the disclosure will be described below. The management device, the scene device and the service device provided in aspects of the disclosure may all be implemented as various types of terminals such as notebook computers, tablet computers, desktop computers, set-top boxes and mobile devices, and may all be implemented as servers. An illustrative application in which the management device, the scene device and the service device are all implemented as servers will be described below.

With reference to FIG. 1, a schematic architectural diagram of a system for processing a virtual scene according to an aspect of the disclosure is shown in FIG. 1. The system for processing a virtual scene provided in an aspect of the disclosure is configured to schedule a loading process of a virtual plot in the virtual scene and respond, based on scheduling, to an operation processing request transmitted by a terminal side. In order to implement a processing application supporting a virtual scene, in the processing system 100 for a virtual scene, a terminal 400 is connected to a second server 500 (service device) by means of a network 300. The second server 500 is connected to a first server 200 (management device) and a third server 600 (scene device) by means of the network 300. The network 300 may be a wide area network, a local area network or their combination.

The first server 200 allocates a to-be-loaded virtual plot to each third server 600 from a plurality of virtual plots in response to start-up messages transmitted by a plurality of third servers 600, and transmits, in a case of each third server 600, a first loading message to the third servers 600 so as to be configured to trigger the third server 600 to load a plot data file of the to-be-loaded virtual plot. The first server 200 transmits loading configuration information to the second server 500. The loading configuration information is used for the second server 500 to determine a third server 600 matching an operation processing request and transmit, based on the operation processing request, a scene processing request to the matching scene device.

The second server 500 is configured to receive the loading configuration information transmitted by the first server 200, determine, in response to the operation processing request transmitted by a terminal 400 and based on the loading configuration information, the third server 600 matching the operation processing request from a plurality of third servers 600 corresponding to the plurality of virtual plots; transmit the scene processing request to the third server 600 matching the operation processing request; receive a processing result, returned by the third server 600 matching the operation processing request, for the scene processing request; and return, based on the processing result, a notification message to the terminal 400.

The third server 600 is configured to transmit a start-up message to the first server 200 in response to a start-up operation; receive the first loading message, returned by the first server 200, for the start-up message, acquire a plot data file of the to-be-loaded virtual plot in response to the first loading message, load the plot data file; receive a scene processing request transmitted by the second server 500; and carry out scene processing on the virtual plot in response to the scene processing request, obtain a processing result, and return the processing result to the second server 500.

The terminal 400 is configured to generate the operation processing request in response to an operation by a user on a graphical interface 410, and transmit the operation processing request to the second server 500; and receive a notification message, returned by the second server 500, for the operation processing request, and display the notification message in the virtual scene shown by the graphical interface 410.

Aspects of the disclosure may be implemented through a cloud technology. The cloud technology refers to a hosting technology that unifies a series of resources such as hardware, software and networks within a wide area network or a local area network to compute, store, process and share data.

The cloud technology is a general term of a network technology, an information technology, an integration technology, a management platform technology, an application technology, etc. based on cloud computing service mode applications, capable of being configured to constitute a resource pool, used according to requirements, flexible and convenient. A cloud computing technology will become an important support. A background service of a technical network system requires a large amount of computation and storage resources and is required to be implemented through cloud computing.

For example, the first server 200, the second server 500 and the third server 600 may each be a stand-alone physical server, a server cluster or distributed system composed of a plurality of physical servers, or a cloud server providing basic cloud computing services, such as a cloud service, a cloud database, cloud computing, a cloud function, cloud storage, a web service, cloud communication, a middleware service, a domain name service, a security service, a content delivery network (CDN), and big data and artificial intelligence platforms. The terminal 400 may be but is not limited to a smartphone, a tablet computer, a notebook computer, a desktop computer, a smart speaker, or a smart watch, etc. The terminal may be directly or indirectly connected to the server through a wired or wireless communication method, which is not limited in an aspect of the disclosure.

Figure 2:
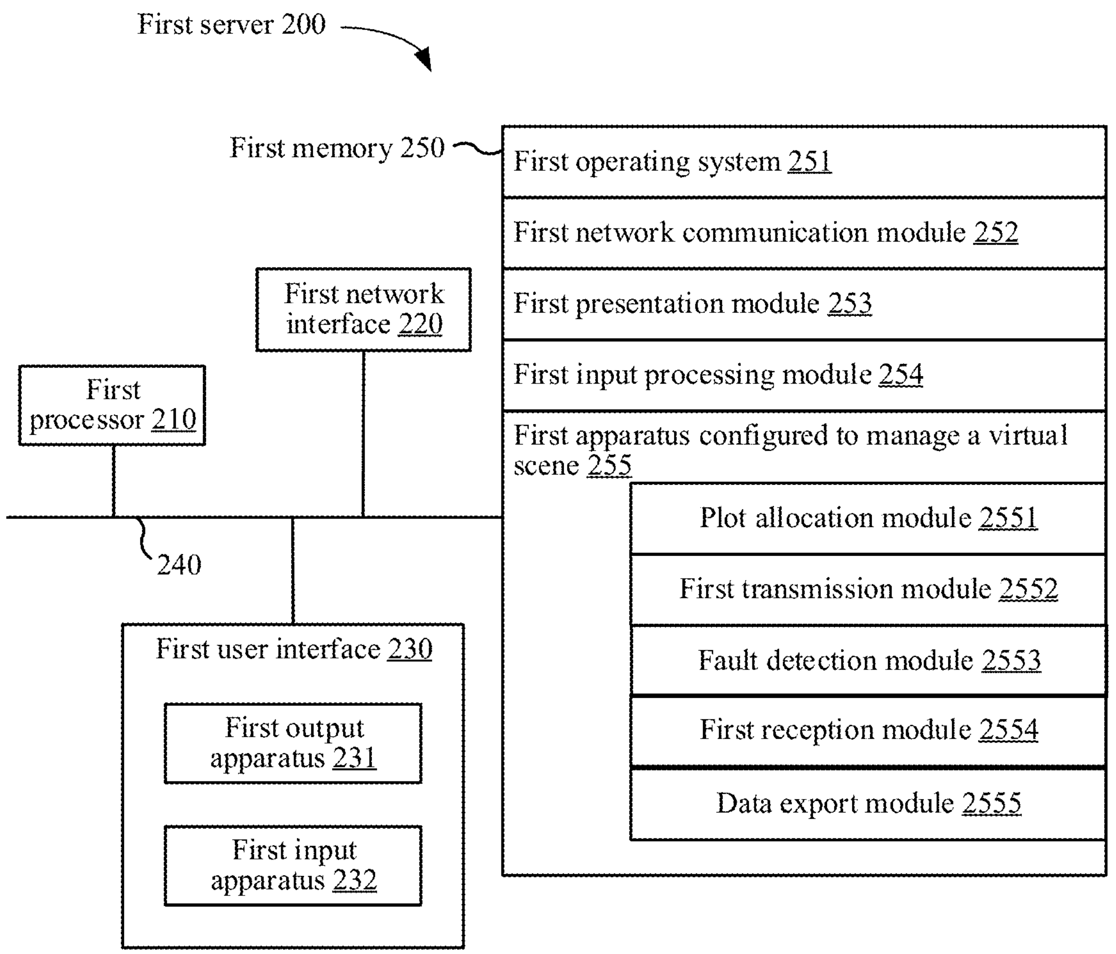
FIG. 2 is a schematic structural diagram of a first server according to an aspect of the disclosure.

With reference to FIG. 2, a schematic structural diagram of a first server (the first server may be an implementation form of a management device) according to an aspect of the disclosure is shown in FIG. 2. The first server 200 shown in FIG. 2 includes at least one first processor 210 (i.e., processing circuitry), a first memory 250 (e.g., a non-transitory computer-readable storage medium), at least one first network interface 220, and a first user interface 230. All components of the first server 200 are coupled together by means of a first bus system 240. The first bus system 240 is configured to implement connection and communication between these components. In addition to a data bus, the first bus system 240 further includes a power bus, a control bus and a status signal bus. However, all buses are marked as first bus systems 240 in FIG. 2 for the sake of clarity.

The first processor 210 may be an integrated circuit chip having a signal processing capability, such as a general-purpose processor, a digital signal processor (DSP) or other programmable logic devices, discrete gate or transistor logic devices, discrete hardware components, etc. The general-purpose processor may be a microprocessor or any processor, etc.

The first user interface 230 includes one or more first output apparatuses 231 that can be configured to present media contents and each includes one or more speakers and/or one or more visual display screens. The first user interface 230 further includes one or more first input apparatuses 232 that each include a user interface component conducive to user input, such as a keyboard, a mouse, a microphone, a touchscreen display screen, a camera, or other input buttons and controls.

The first memory 250 may be a removable memory, a non-removable memory, or their combination. Illustrative hardware devices include a solid-state memory, a hard disc drive, an optical disc drive, etc. In some aspects, the first memory 250 includes one or more storage devices physically away from the first processor 210.

The first memory 250 includes a volatile memory, a non-volatile memory, or a volatile memory and a non-volatile memory. The non-volatile memory may be a read only memory (ROM). The volatile memory may be a random access memory (RAM). The first memory 250 described in an aspect of the disclosure is intended to include any suitable type of memory.

In some aspects, the first memory 250 can store data to support various operations. Examples of such data include programs, modules, data structures, or their subsets or supersets, which will be illustratively described below.

A first operating system 251 includes a system program configured to process various basic system services and execute hardware related tasks, such as a framework layer, a core library layer, a driver layer, etc., and is configured to implement various basic services and process hardware based tasks.

A first network communication module 252 is configured to reach other computing devices by means of one or more (wired or wireless) first network interfaces 220. Illustrative first network interfaces 220 include Bluetooth, WiFi, a universal serial bus (USB), etc.

A first presentation module 253 is configured to present information by means of one or more first output apparatuses 231 (such as display screens and speakers) associated with the first user interface 230 (for example, configured as a user interface for operating a peripheral device and displaying contents and information).

A first input processing module 254 is configured to detect one or more pieces of user input or interactions from one of one or more first input apparatuses 232 and interpret the detected input or interactions.

In some aspects, a first apparatus configured to process a virtual scene provided in an aspect of the disclosure may be implemented as software. FIG. 2 shows the first apparatus configured to process a virtual scene 255 and stored in the first memory 250. The first apparatus may be software in the form of a program, a plug-in, etc., which includes software modules as follows: a plot allocation module 2551, a first transmission module 2552, a malfunction detection module 2553, a first reception module 2554 and a data export module 2555. These modules are logical and thus can be arbitrarily combined or uncombined according to functions implemented thereby. Functions of all the modules will be described hereinafter.

Figure 3:
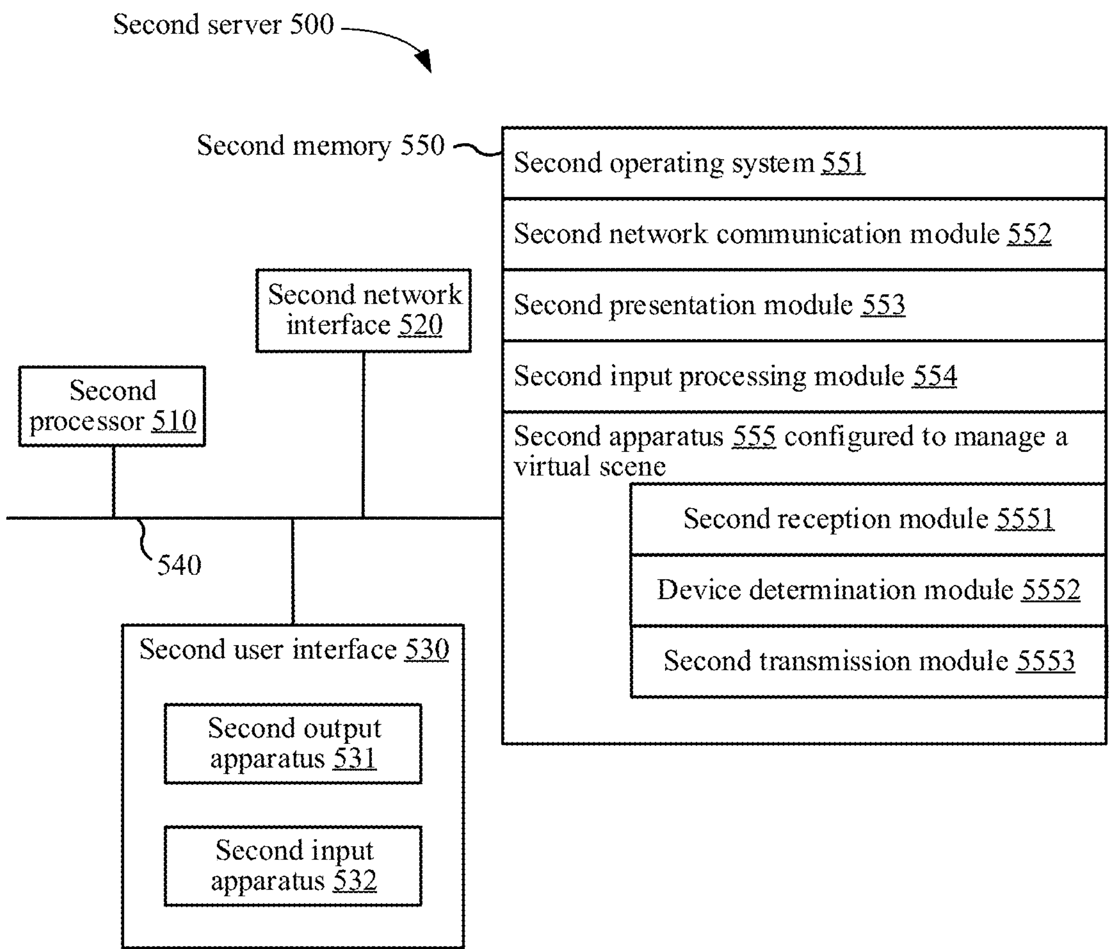
FIG. 3 is a schematic structural diagram of a second server according to an aspect of the disclosure.

With reference to FIG. 3, a schematic structural diagram of a second server (the second server may be an implementation form of a service device) according to an aspect of the disclosure is shown in FIG. 3. The second server 500 shown in FIG. 3 includes at least one second processor 510, a second memory 550, at least one second network interface 520, and a second user interface 530. All components of the second server 500 are coupled together by means of a second bus system 540. The second bus system 540 is configured to implement connection and communication between these components. In addition to a data bus, the second bus system 540 further includes a power bus, a control bus and a status signal bus. However, all buses are marked as second bus systems 540 in FIG. 3 for the sake of clarity.

The second processor 510 may be an integrated circuit chip having a signal processing capability, such as a general-purpose processor, a digital signal processor (DSP) or other programmable logic devices, discrete gate or transistor logic devices, discrete hardware components, etc. The general-purpose processor may be a microprocessor or any processor, etc.

Implementation of a second user interface 530 is similar to that of the first user interface 230 and will not be repeated.

A second memory 550 may be a removable memory, a non-removable memory, or their combination. Illustrative hardware devices include a solid-state memory, a hard disc drive, an optical disc drive, etc. In some aspects, the second memory 550 includes one or more storage devices physically away from the second processor 510.

The second memory 550 includes a volatile memory, a non-volatile memory, or a volatile memory and a non-volatile memory. The non-volatile memory may be a read only memory (ROM). The volatile memory may be a random access memory (RAM). The second memory 550 described in an aspect of the disclosure is intended to include any suitable type of memory.

In some aspects, the second memory 550 can store data to support various operations. Examples of such data include programs, modules, data structures, or their subsets or supersets, which will be illustratively described below.

Implementation of a second operating system 551 is similar to that of the first operating system 251 and will not be repeated.

Implementation of a second network communication module 552 is similar to that of the first network communication module 252 and will not be repeated.

Implementation of a second presentation module 553 is similar to that of a first presentation module 253 and will not be repeated.

Implementation of a second input processing module 554 is similar to that of a first input processing module 254 and will not be repeated.

In some aspects, a second apparatus configured to process a virtual scene provided in an aspect of the disclosure may be implemented as software. FIG. 3 shows the second apparatus configured to process a virtual scene 555 and stored in the second memory 550. The second apparatus may be software in the form of a program, a plug-in, etc., which includes software modules as follows: a second reception module 5551, a device determination module 5552 and a second transmission module 5553. These modules are logical and thus can be arbitrarily combined or uncombined according to functions implemented thereby. Functions of all the modules will be described hereinafter.

Figure 4:
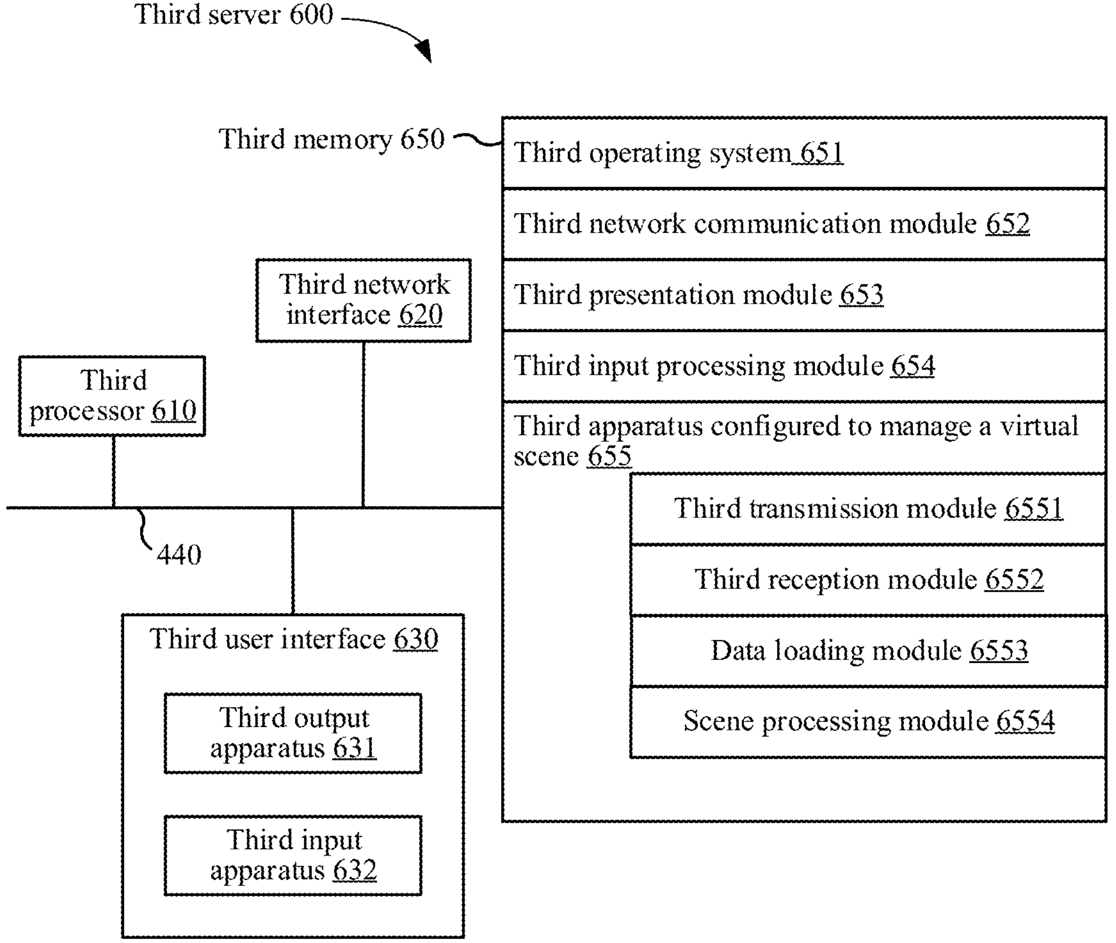
FIG. 4 is a schematic structural diagram of a third server according to an aspect of the disclosure.

With reference to FIG. 4, a schematic structural diagram of a third server (the third server may be an implementation form of a scene device) according to an aspect of the disclosure is shown in FIG. 4. The third server 600 shown in FIG. 4 includes at least one third processor 610, a third memory 650, at least one third network interface 620, and a third user interface 630. All components of the third server 600 are coupled together by means of a third bus system 640. The third bus system 640 is configured to implement connection and communication between these components. In addition to a data bus, the third bus system 640 further includes a power bus, a control bus and a status signal bus. However, all buses are marked as third bus systems 640 in FIG. 4 for the sake of clarity.

The third processor 610 may be an integrated circuit chip having a signal processing capability, such as a general-purpose processor, a digital signal processor (DSP) or other programmable logic devices, discrete gate or transistor logic devices, discrete hardware components, etc. The general-purpose processor may be a microprocessor or any processor, etc.

Implementation of a third user interface 630 is similar to that of the first user interface 230 and will not be repeated.

The third memory 650 may be a removable memory, a non-removable memory, or their combination. Illustrative hardware devices include a solid-state memory, a hard disc drive, an optical disc drive, etc. In some aspects, the third memory 650 includes one or more storage devices physically away from the third processor 610.

The third memory 650 includes a volatile memory, a non-volatile memory, or a volatile memory and a non-volatile memory. The non-volatile memory may be a read only memory (ROM). The volatile memory may be a random access memory (RAM). The third memory 650 described in an aspect of the disclosure is intended to include any suitable type of memory.

In some aspects, the third memory 650 can store data to support various operations. Examples of such data include programs, modules, data structures, or their subsets or supersets, which will be illustratively described below.

Implementation of a third operating system 651 is similar to that of the first operating system 251 and will not be repeated.

Implementation of a third network communication module 652 is similar to that of the first network communication module 252 and will not be repeated.

Implementation of a third presentation module 653 is similar to that of the first presentation module 253 and will not be repeated.

Implementation of a third input processing module 654 is similar to that of the first input processing module 254 and will not be repeated.

In some aspects, a third apparatus configured to process a virtual scene provided in an aspect of the disclosure may be implemented as software. FIG. 4 shows the third apparatus configured to process a virtual scene 655 and stored in the third memory 650. The third apparatus may be software in the form of a program, a plug-in, etc., which includes software modules as follows: a third transmission module 6551, a third reception module 6552, a data loading module 6553 and a scene processing module 6554. These modules are logical and thus can be arbitrarily combined or uncombined according to functions implemented thereby. Functions of all the modules will be described hereinafter.

In some other aspects, the first apparatus, the second apparatus and the third apparatus configured to process a virtual scene provided in aspects of the disclosure may be implemented as hardware. As an example, the first apparatus, the second apparatus and the third apparatus provided in aspects of the disclosure may be processors in the form of hardware decoding processors, which are programmed to execute the method for processing a virtual scene provided in an aspect of the disclosure. For example, the processor in the form of a hardware decoding processor may employ one or more application specific integrated circuits (ASICs), digital signal processors (DSPs), programmable logic devices (PLDs), complex programmable logic devices (CPLDs), field-programmable gate arrays (FPGAs) or other electronic elements.

In some aspects, the first server, the second server and the third server may implement the method for processing a virtual scene provided in an aspect of the disclosure by running computer programs. For example, the computer program may be a native program or software module in an operating system; a native application (APP), that is, a program that is required to be installed in an operating system to run, such as a game APP; a mini program, that is, a program that is only required to be downloaded into a browser environment to run; or a mini program that can be embedded into any APP. In summary, the above computer program may be any form of application, module or plug-in.

Aspects of the disclosure can be applied to processes of processing of cloud technology, artificial intelligence, intelligent transportation, in-vehicle scenes and other virtual scenes. Hereinafter, the method for processing a virtual scene provided in an aspect of the disclosure will be described in combination with illustrative application and implementation of the management device, the service device and the scene device provided in aspects of the disclosure.

Figure 5:
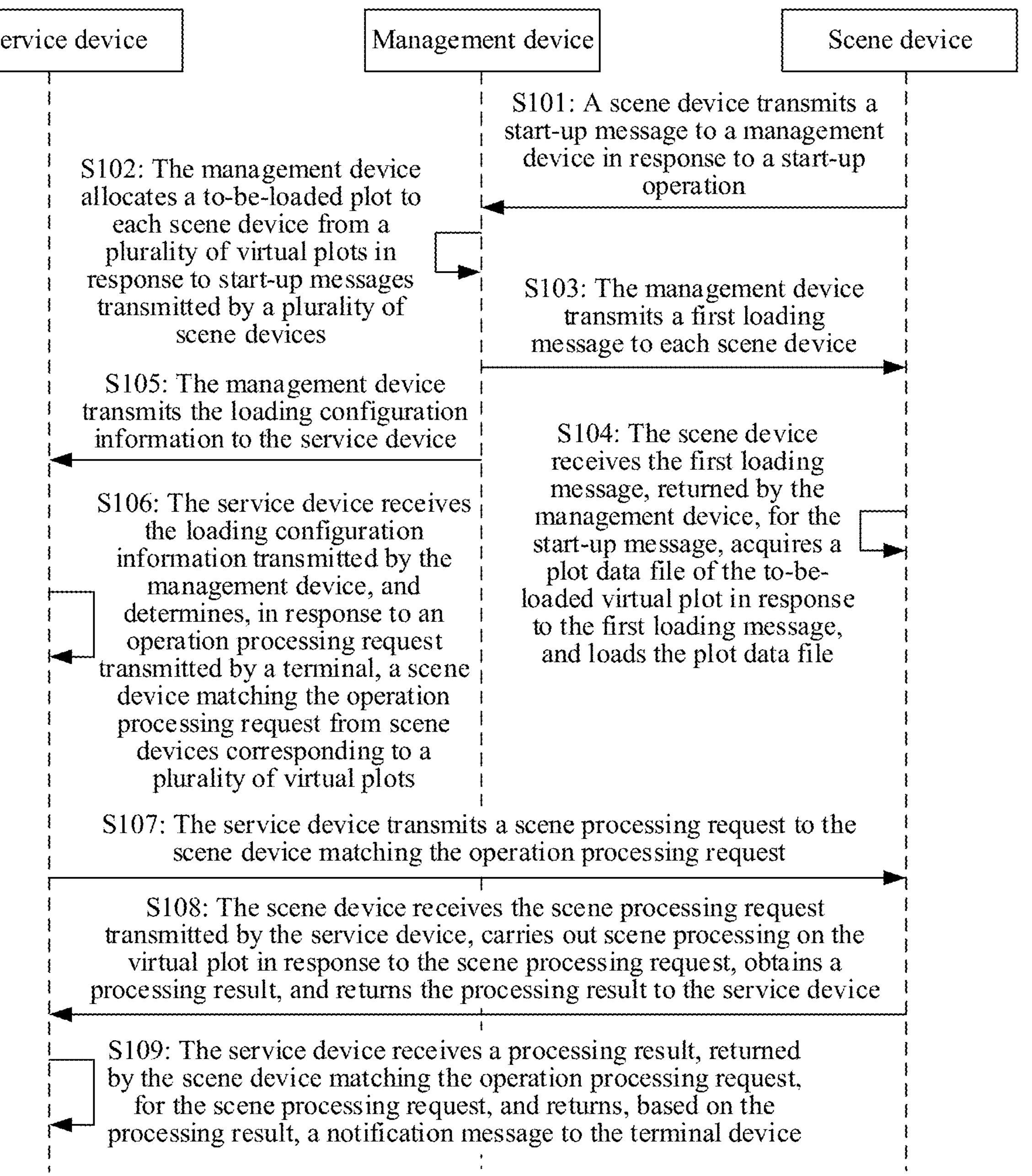
FIG. 5 is a schematic flow diagram of a method for processing a virtual scene according to an aspect of the disclosure.

With reference to FIG. 5, a schematic flow diagram of a method for processing a virtual scene according to an aspect of the disclosure is provided in FIG. 5. Description will be carried out in combination with operations shown in FIG. 5.

S101: A scene device transmits a start-up message to a management device in response to a start-up operation.

An aspect of the disclosure is implemented in a situation of managing a virtual scene, for example, managing a virtual scene in a game to implement processing logic of the game, or managing a virtual scene in virtual reality to interact with a user, etc. In an aspect of the disclosure, a plurality of scene devices configured to load different virtual plots, a management device configured to manage a loading process of the plurality of scene devices, and a service device configured to directly carry out data interaction with a terminal of a user when the virtual scene runs are arranged. When detecting a start-up operation, each scene device generates a start-up message in response to the start-up operation and transmits the start-up message to the management device by means of a network. The management device receives the start-up message transmitted by each scene device. The start-up message is configured to indicate to the management device that the scene device is ready to start loading a plot data file.

The start-up operation may be an operation of starting up the scene device or an operation of triggering the scene device to load a plot data file, which is not particularly limited in an aspect of the disclosure.

S102: The management device allocates a to-be-loaded virtual plot to each scene device from a plurality of virtual plots in response to start-up messages transmitted by a plurality of scene devices.

In some aspects, S102 mentioned above may be implemented through a method as follows: the management device randomly allocates a to-be-loaded virtual plot to each scene device from a plurality of virtual plots in response to start-up messages transmitted by a plurality of scene devices.

In some aspects, after the to-be-loaded virtual plot is randomly allocated to each scene device from the plurality of virtual plots, loading configuration information may be established based on the to-be-loaded virtual plot allocated to each scene device and based on each scene device.

In some other aspects, S102 mentioned above may be implemented through a method as follows: the management device acquires a plot quantity of the plurality of virtual plots and a device quantity of the scene devices in response to the start-up messages transmitted by the plurality of scene devices, divides the plot quantity by the device quantity, obtains a target quantity, and allocates a target quantity of to-be-loaded virtual plots to each scene device from the plurality of virtual plots when the target quantity is an integer.

In some aspects, after the target quantity of to-be-loaded virtual plots are randomly allocated to each scene device from the plurality of virtual plots, loading configuration information may be established based on the to-be-loaded virtual plot allocated to each scene device and based on each scene device.

In some other aspects, S102 mentioned above may be implemented through a method as follows: the management device reads the loading configuration information in response to the start-up messages transmitted by the plurality of scene devices, and allocates, based on the loading configuration information, the to-be-loaded virtual plot to each scene device from the plurality of different virtual plots.

In some aspects, after receiving the start-up message transmitted by each scene device, the management device reads the loading configuration information and determines, by means of the loading configuration information, a virtual plot waiting to be loaded by each virtual device, that is, a to-be-loaded virtual plot, for each virtual device from the plurality of different virtual plots.

In some aspects, the loading configuration information includes an index entry corresponding to each scene device. The index entry includes an identifier of the scene device and the to-be-loaded virtual plot of the scene device. The identifier of the scene device is configured to uniquely identify the scene device.

As an example, schematic reference can be made to following Table 1 for the loading configuration information. Following Table 1 is a schematic table of loading configuration information according to an aspect of the disclosure.

TABLE 1

Schematic table of loading configuration information

| Loading configuration information | Identifier of scene device | To-be-loaded virtual plot of scene device |
|---|---|---|
| Index entry 1 | Scene device A | Virtual plot A1 |
| Index entry 2 | Scene device B | Virtual plot B1 |
| Index entry 3 | Scene device C | Virtual plot C1 |
| Index entry 4 | Scene device D | Virtual plot D1 |

In some aspects, the above operation of allocating, based on loading configuration information, a to-be-loaded virtual plot to each scene device from a plurality of virtual plots may be implemented through a method as follows: carry out, in a case of each scene device, a query for a target index entry including an identifier of the scene device from a plurality of index entries of the loading configuration information; determine the virtual plot in the target index entry as the to-be-loaded virtual plot corresponding to the scene device; and allocate the to-be-loaded virtual plot to the scene device.

The plurality of virtual plots are obtained by segmenting the virtual scene. The to-be-loaded virtual plot of each scene device is one of the plurality of virtual plots. That is, in an aspect of the disclosure, a scene device loads only one virtual plot (the virtual plot can be understood as part of the virtual scene) in the virtual scene. However, map extent of the virtual plot is certainly much less than map extent of the entire virtual scene and is required to take up only small memory overhead.

The loading configuration information is configured to record the to-be-loaded virtual plot of each scene device. The loading configuration information may exist in the form of a data table, or in the form of text or voice, (in this case, the text or voice may be recognized and parsed by the management device through an artificial intelligence technology, such that a to-be-loaded virtual plot of each scene device is obtained), etc.

In some aspects of the disclosure, the loading configuration information may be established by operation and maintenance staff or management staff of the virtual scene. For example, the operation and maintenance may designate virtual plot 1 as the to-be-loaded virtual plot for scene device

1, and virtual plot 3 as the to-be-loaded virtual plot for scene device 2, such that the loading configuration information is obtained.

In some other aspects of the disclosure, the loading configuration information may be generated by the management device itself. For example, the management device may evaluate memory overhead required by each virtual plot in terms of a quantity and complexity (which may be read from a plot data file) of objects included in each virtual plot, simultaneously read performance parameters (such as a memory size and an operation speed) of a plurality of scene devices, determine, based on the memory overhead and the performance parameters, a suitable scene device for each virtual plot, and therefore obtain the loading configuration information.

S103: The management device transmits a first loading message to each scene device.

In some aspects, the first loading message is configured to trigger the scene device to load the plot data file of the to-be-loaded virtual plot.

In some aspects, after allocating the to-be-loaded virtual plot to each scene device, the management device may generate, based on an identifier (such as a number or name) of the to-be-loaded virtual plot, the first loading message for each scene device, and transmit the first loading message to each scene device by means of a network. The scene device receives the first loading message, returned by the management device, for the start-up message.

The management device may directly package the identifier of the to-be-loaded virtual plot, or encrypt and then package the identifier, and then encapsulate an obtained data packet by means of an address of the scene device such that the first loading message can be obtained.

S104: The scene device receives the first loading message, returned by the management device, for the start-up message, acquires a plot data file of the to-be-loaded virtual plot in response to the first loading message, and loads the plot data file.

In some aspects, the to-be-loaded virtual plot is one of a plurality of virtual plots obtained by segmenting the virtual scene.

In some aspects, the scene device responds to the received first loading message, acquires the plot data file of the to-be-loaded virtual plot, loads the plot data file in a memory of the scene device after a corresponding plot data file is obtained, and therefore loads the virtual plot. The to-be-loaded virtual plot is one of a plurality of virtual plots obtained by segmenting the virtual scene.

In some aspects, the plot data file of the to-be-loaded virtual plot may be acquired from a storage space of the scene device itself. In this case, the storage space may store plot data files (which may be copied in beforehand by the operation and maintenance staff or management staff) corresponding to a plurality of virtual plots. The scene device acquires the plot data file of the to-be-loaded virtual plot by the identifier parsed from the first loading message.

In some other aspects, the plot data file of the to-be-loaded virtual plot may be pulled from the management device by the scene device by means of a data pulling message.

S105: The management device transmits the loading configuration information to the service device.

In some aspects, the loading configuration information records a virtual plot belonging to each scene device and is configured for the service device to determine a scene device matching an operation processing request and transmit, based on the operation processing request, a scene processing request to the matching scene device.

In an aspect of the disclosure, the virtual scene is divided into a plurality of virtual plots to be loaded in a plurality of scene devices. When the service device carries out data interaction with the terminal of the user, the scene device is required to carry out corresponding logical processing (such as collision detection and radiographic testing). Therefore, the management device is further required to synchronize the loading configuration information to the service device by means of a network. The service device determines, based on the loading configuration information, scene devices responsible for loading different virtual plots, so as to manage the scene. The service device receives the loading configuration information synchronized by the management device.

S105 and S103-S104 may alternatively be executed in other order. For example, the management device may alternatively execute S105 and then execute S103-S104, or synchronously execute S103-S104 (S103-S104 are regarded as a whole herein) and S105, which is not limited in an aspect of the disclosure.

S106: The service device receives the loading configuration information transmitted by the management device, and determines, in response to an operation processing request transmitted by a terminal and based on the loading configuration information, a scene device matching the operation processing request from scene devices corresponding to a plurality of virtual plots.

In some aspects, the loading configuration information records a virtual plot belonging to each scene device. The plurality of virtual plots are obtained by segmenting the virtual scene.

In some aspects, the service device is a device that is directly in communication with a terminal of a user. The terminal generates an operation processing request in response to an operation by the user in the virtual scene, and transmits the operation processing request to the service device. After receiving the operation processing request, the service device first determines a position of a virtual object corresponding to the user in the virtual scene, so as to determine a virtual plot in which the virtual object is located, then reads the loading configuration information, and selects, according to the virtual plot in which the virtual object is located, a scene device corresponding to the virtual plot in which the virtual object is located from a plurality of scene devices configured to load a plurality of virtual plots. The selected scene device is a scene device matching the operation processing request. The plurality of virtual plots are obtained by segmenting the virtual scene.

In some aspects, the above operation processing request carries a position of the virtual object in the virtual scene. The virtual object may be a virtual object controlled by the terminal of the user. The virtual plot in which the virtual object is located is determined based on the position of the virtual object in the virtual scene.

The operation processing request may be a request made by the terminal when the user triggers use of a virtual prop, for example, a request issued when a capture prop is configured to capture a virtual pet in the virtual scene, or a request issued when a capture prop is configured to collect a virtual resource in the virtual scene. The operation processing request may alternatively be a request made by the terminal when a user interacts with a movable virtual object, for example, a request made when the user plays against a virtual object of another player, or a request made when the user attacks a movable wild monster in the virtual scene.

In some aspects, the above operation of determining, based on the loading configuration information, a scene device matching the operation processing request from a plurality of scene devices corresponding to a plurality of virtual plots may be implemented through a method as follows: acquire a position of a virtual object carried in the operation processing request in the virtual scene, and determine, based on the position of the virtual object in the virtual scene, a target virtual plot in which the virtual object is located in the virtual scene; and determine, based on the loading configuration information, the scene device corresponding to the target virtual plot, and determine the scene device corresponding to the target virtual plot as the scene device matching the operation processing request.

In some aspects, the above operation of determining, based on the position of the virtual object in the virtual scene, the target virtual plot in which the virtual object is located in the virtual scene may be implemented through a method as follows: acquire a scene position range of each virtual plot in the virtual scene; compare the position of the virtual object in the virtual scene with each position range; obtain a comparison result corresponding to each position range; and determine, when the comparison result indicates that the position of the virtual object in the virtual scene is within the position range, the virtual plot corresponding to the comparison result as the target virtual plot.

In some aspects, the above operation of determining, based on the loading configuration information, the scene device corresponding to the target virtual plot may be implemented through a method as follows: carry out a query for a reference index entry including an identifier of the target virtual plot from the loading configuration information; and determine the scene device in the reference index entry as the scene device corresponding to the target virtual plot.

S107: The service device transmits a scene processing request to the scene device matching the operation processing request.

In some aspects, the scene device matching the operation processing request receives the scene processing request transmitted by the service device.

S108: The scene device receives the scene processing request transmitted by the service device, carries out scene processing on the virtual plot in response to the scene processing request, obtains a processing result, and returns the processing result to the service device.

In some aspects, after receiving the scene processing request transmitted by the service device, the scene device starts carrying out scene processing on the virtual plot corresponding to the scene device, so as to complete service logic processing on the virtual scene, for example, determines whether a prop of the virtual object hits a target, or determines whether a height at which the virtual object is located in the virtual scene reaches a preset height, so as to obtain a processing result. Then, the scene device will return the processing result to the service device. The service device receives a processing result, returned by the scene device matching the operation processing request, for the scene processing request.

In some aspects, the above operations of carrying out scene processing on the virtual plot, and obtaining a processing result may be implemented through a method as follows: carry out collision detection and radiographic testing on an object in the virtual plot, and obtain the processing result. The processing result includes a collision detection result and a radiographic testing result.

In some aspects, the above operations of carrying out collision detection and radiographic testing on an object in the virtual plot, and obtaining the processing result may be implemented through a method as follows: acquire a virtual object carried in the scene processing request; carry out, based on the virtual object, the collision detection on the object in the virtual plot, and obtain the collision detection result; and carry out, based on the virtual object, the radiographic testing on the object in the virtual plot, and obtain the radiographic testing result.

In some aspects, the above operations of carrying out, based on the virtual object, the collision detection on the object in the virtual plot, and obtaining the collision detection result may be implemented through a method as follows: generate a collision detection line with the virtual object as a start point and the object in the virtual plot as an end point in the virtual scene; when the collision detection line does not intersect with other objects in the virtual scene, determine the collision detection result as a first detection result, where the first detection result is used to indicate that the prop of the virtual object can hit the target on the object in a virtual ground body; and when the collision detection line intersects with other objects in the virtual scene, determine the collision detection result as a second detection result, where the second detection result is used to indicate that the prop of the virtual object cannot hit the target on the object in the virtual ground body.

In some aspects, the above operations of carrying out, based on the virtual object, the radiographic testing on the object in the virtual plot, and obtaining the radiographic testing result may be implemented through a method as follows: generate a radiographic testing line with the virtual object as a start point and the object in the virtual plot as an end point in the virtual scene, and acquire a length of the radiographic testing line; when the length of the radiographic testing line reaches a preset height, determine the radiographic testing result as a third detection result, where the third detection result is used to indicate that the height at which the virtual object is located in the virtual scene reaches the preset height; and when the length of the radiographic testing line does not reach the preset height, determine the radiographic testing result as a fourth detection result, where the fourth detection result is used to indicate that the height at which the virtual object is located in the virtual scene does not reach the preset height.

S109: The service device receives a processing result, returned by the scene device matching the operation processing request, for the scene processing request, and returns, based on the processing result, a notification message to the terminal device.

After receiving the processing result, the service device may determine a notification message for the operation processing request by means of information indicated by the processing result, for example, generate a notification message that the target is not successfully captured by means of the processing result indicating that the virtual prop does not hit the target, or generate a notification message of not being located on a task plane by indicating that the height on which the virtual object is located does not reach a preset height, etc., and transmit the notification message to the terminal of the user by means of a network, such that the user knows whether the operation processing request is completed.

Compared with the related art having the problems of high memory overhead and low processing efficiency when the virtual scene is processed, an aspect of the disclosure has effects that a management device allocates a plurality of virtual plots obtained by segmenting a virtual scene to a plurality of scene devices. Each scene device is asked, by means of a first loading message, to load a to-be-loaded virtual plot. By synchronizing loading configuration information to a service device, the service device can find, based on the loading configuration information, a corresponding scene device from the plurality of scene devices running in parallel, so as to carry out scene processing. Since a map range of the virtual plot is much less than a map range of the entire virtual scene and a quantity of objects included in the virtual plots is less than a quantity of objects of the entire virtual scene, by segmenting the virtual scene into a plurality of virtual plots and loading the plurality of virtual plots in parallel by means of a plurality of scene devices, each scene device can manage the virtual plot with high management efficiency by only requiring less memory overhead. Finally, memory overhead caused when the virtual scene is processed is effectively reduced and processing efficiency of the virtual scenes is improved.

Figure 6:
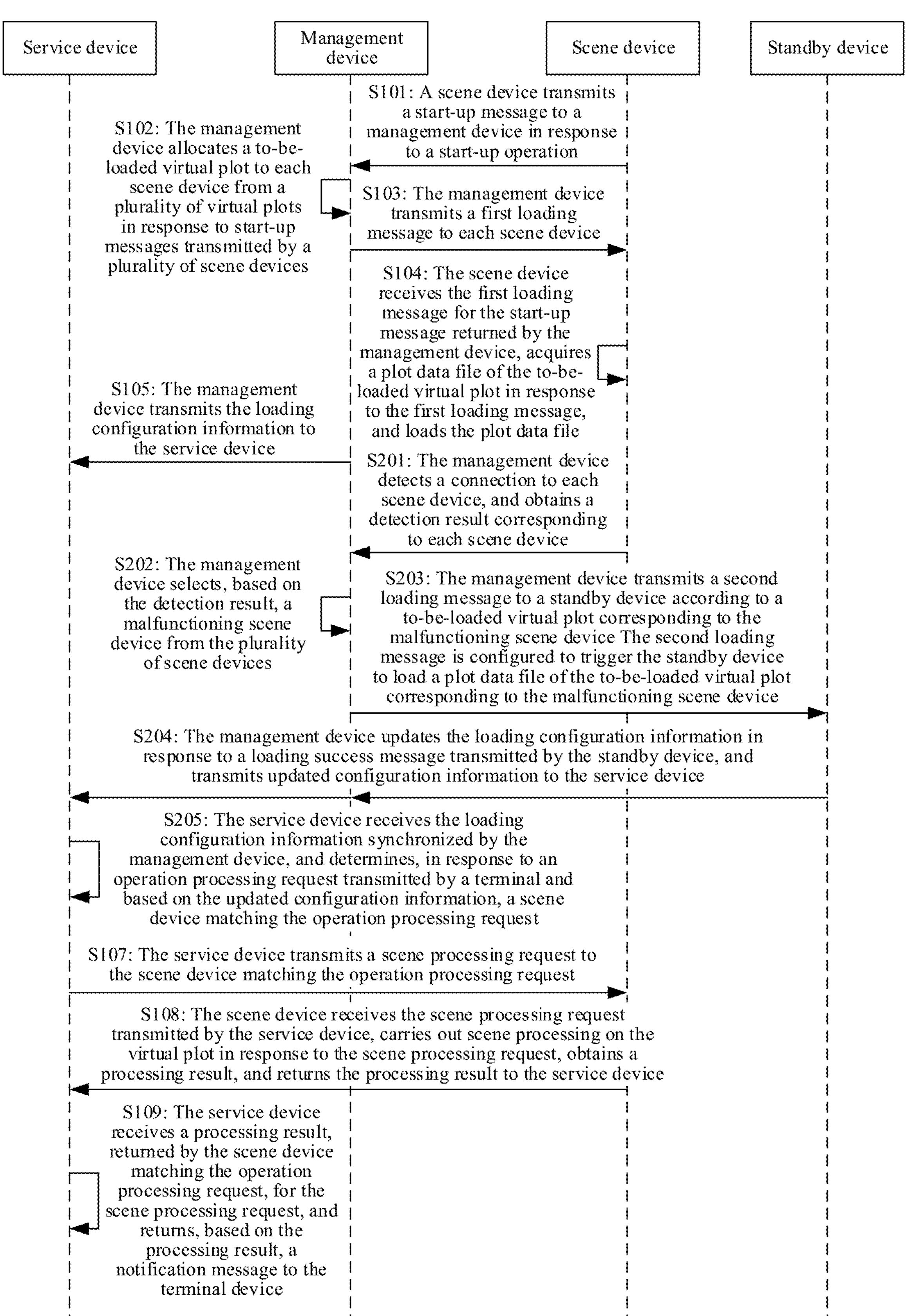
FIG. 6 is another schematic flow diagram of a method for processing a virtual scene according to an aspect of the disclosure.

Based on FIG. 5 and with reference to FIG. 6, another schematic flow diagram of a method for processing a virtual scene according to an aspect of the disclosure is shown in FIG. 6. In some aspects of the disclosure, after the management device transmits the loading configuration information to the service device and before the service device transmits the scene processing request to the scene device matching the operation processing request, that is, after S105 and before S107, the method may further include:

S201: The management device detects a connection to each scene device, and obtains a detection result corresponding to each scene device.

The detection result indicates whether a connection to the scene device is broken. That is, the management device is required to detect whether a connection with each scene device is normal, so as to obtain a detection result corresponding to each scene device. The management device may establish a communication connection with each scene device, so as to determine whether a connection of the management device to each scene device is normal through the communication connection, and may alternatively determine, by randomly transmitting detection data to the scene device, whether the connection to each scene device is normal according to whether the scene device returns reception confirmation information for the detection data.

S202: The management device selects, based on the detection result, a malfunctioning scene device from the plurality of scene devices.

In some aspects, by reading a value corresponding to a malfunction determination field from a plurality of detection results or matching the plurality of detection results with a preset result indicating that a connection is broken (for example, computing similarity), the management device may determine whether the detection result indicates that a connection to the scene device is broken, extract the detection result indicating that a connection to the scene device is broken, and determine the scene device corresponding to the extracted detection result as the malfunctioning scene device. That is, in an aspect of the disclosure, the malfunctioning scene device includes a disconnected scene device.

In some aspects, the above operation of selecting, based on the detection result, a malfunctioning scene device from a plurality of scene devices may be implemented through a method as follows: carry out the following processing on each scene device: when the detection result of the scene device indicates that the scene device is disconnected from the management device, determine the scene device as the malfunctioning scene device; and when the detection result of the scene device indicates that the scene device is not disconnected from the management device, determine the scene device as a non-malfunctioning scene device.

S203: The management device transmits a second loading message to a standby device according to a to-be-loaded virtual plot corresponding to the malfunctioning scene device. The second loading message is used to trigger the standby device to load a plot data file of the to-be-loaded virtual plot corresponding to the malfunctioning scene device.

In an aspect of the disclosure, at least one standby device is additionally deployed in addition to the plurality of scene devices. The management device generates, based on an identifier (a number or name) of the to-be-loaded virtual plot of the malfunctioning scene device, the second loading message, and transmits the second loading message to the standby device. When receiving the second loading message, the standby device loads a plot data file of the to-be-loaded virtual plot of the malfunctioning scene device in the memory in response to the second loading message, so as to replace the malfunctioning scene device to manage the corresponding virtual plot.

A plot data file of each virtual plot may be stored in advance in the standby device such that the standby device can rapidly replace, when a scene device malfunctions, the malfunctioning scene device to process the virtual scene. The standby device can also pull the plot data file of the to-be-loaded virtual plot of the malfunctioning scene device from the management device in real time such that a storage space of the standby device can be saved.

S204: The management device updates the loading configuration information in response to a loading success message transmitted by the standby device, and transmits updated configuration information to the service device.

In some aspects, the updated configuration information is used to trigger the service device to determine a scene device matching the operation processing request.

In some aspects, the standby device returns a loading success message for the second loading message to the management device after loading the plot data file. After receiving the loading success message, the management device updates original loading configuration information, that is, replaces the malfunctioning scene device with a standby device, and transmits the obtained updated configuration information to the service device. The service device receives the updated configuration information transmitted by the management device.

S205: The service device receives the loading configuration information transmitted by the management device, and determines, in response to an operation processing request transmitted by a terminal and based on the updated configuration information, a scene device matching the operation processing request.

In the updated configuration information, the malfunctioning scene device of the plurality of scene devices is replaced with the standby device. The service device determines a scene device matching the operation processing request in the updated configuration information. In this case, the scene device matching the operation processing request may be a newly added standby device (that is, an original scene device malfunctions) or an original scene device (which is a non-malfunctioning scene device).

In some aspects, the above operation of determining, based on the updated configuration information, a scene device matching the operation processing request may be implemented through a method as follows: acquire a position of a virtual object carried in the operation processing request in the virtual scene; determine, based on the position of the virtual object in the virtual scene, a target virtual plot in which the virtual object is located in the virtual scene;

determine, based on the updated configuration information, the scene device corresponding to the target virtual plot; and determine the scene device corresponding to the target virtual plot as the scene device matching the operation processing request.

In some aspects, the above operation of determining, based on the updated configuration information, the scene device corresponding to the target virtual plot may be implemented through a method as follows: carry out a query for a reference index entry including an identifier of the target virtual plot from the updated configuration information; and determine the scene device in the reference index entry as the scene device corresponding to the target virtual plot.

In an aspect of the disclosure, the management device can replace, when a scene device malfunctions, the malfunctioning scene device with a standby device, so as to implement a disaster tolerance mechanism for a processing process of the virtual scene such that the virtual scene can be more reliably and stably processed.

Figure 7:
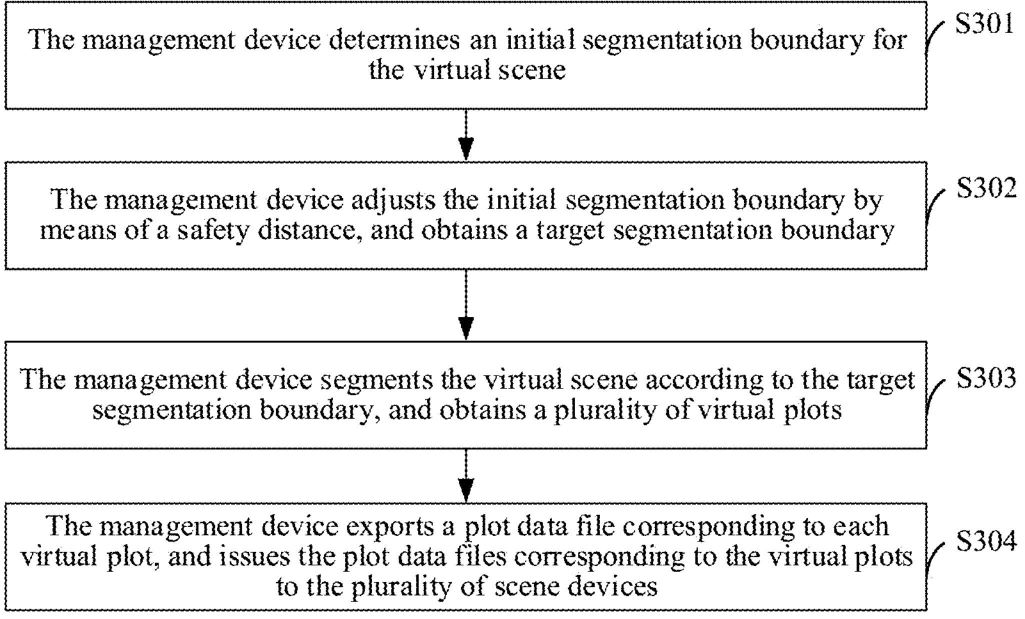
FIG. 7 is yet another schematic flow diagram of a method for processing a virtual scene according to an aspect of the disclosure.

With reference to FIG. 7, yet another schematic flow diagram of a method for processing a virtual scene according to an aspect of the disclosure is shown in FIG. 7. In some aspects of the disclosure, before the scene device transmits a start-up message to a management device in response to a start-up operation, that is, before S101, the method may further include S301-S304, as follows:

S301: The management device determines an initial segmentation boundary for the virtual scene.

In some aspects, the management device may determine the initial segmentation boundary for the entire virtual scene to preset scale (for example, determine the initial segmentation boundary to equal scale). In some other aspects, the management device may alternatively determine the initial segmentation boundary for the entire virtual scene according to different scene contents (for example, determine, when scene contents of a lake and a mountain are different, a demarcation road of the lake and the mountain as the initial segmentation boundary), which is not specifically limited in an aspect of the disclosure.

In some aspects, an initial segmentation boundary is used to segment the virtual scene, such that a virtual plot delimited by the initial segmentation boundary is obtained.

S302: The management device adjusts the initial segmentation boundary by means of a safety distance, and obtains a target segmentation boundary.

In some aspects, a plot area of the virtual plot obtained based on the target segmentation boundary is greater than or equal to a plot area of the virtual plot obtained based on the initial segmentation boundary.

In some aspects, the above safety distance is used to indicate a size of a minimum segmentation boundary of the virtual plot that guarantees that scene processing such as collision detection and radiographic testing normally works.

In some aspects, the above operations of adjusting the initial segmentation boundary by means of a safety distance, and obtaining a target segmentation boundary may be implemented through a method as follows: evaluate, based on the safety distance, the initial segmentation boundary, and obtain an evaluation result of the initial segmentation boundary; when the evaluation result indicates that the virtual plot obtained based on the initial segmentation boundary guarantees that scene processing such as collision detection and radiographic testing can normally works, determine the initial segmentation boundary as the target segmentation boundary; and when the evaluation result indicates that the virtual plot obtained based on the initial segmentation boundary cannot guarantee that scene processing such as collision detection and radiographic testing normally works, upscale the initial segmentation boundary and obtain the target segmentation boundary. The virtual plot obtained based on the target segmentation boundary can guarantee that scene processing such as collision detection and radiographic testing normally works.

In some aspects, the above operations of evaluating, based on the safety distance, the initial segmentation boundary, and obtaining an evaluation result of the initial segmentation boundary may be implemented through a method as follows: acquire a size of the initial segmentation boundary; when the size of the initial segmentation boundary is greater than or equal to the safety distance, determine the evaluation result as a first evaluation result, where the first evaluation result is used to indicate that the virtual plot obtained based on the initial segmentation boundary can guarantee that scene processing such as collision detection and radiographic testing normally works; and when the size of the initial segmentation boundary is less than the safety distance, determine the evaluation result as a second evaluation result, where the second evaluation result is used to indicate that the virtual plot obtained based on the initial segmentation boundary cannot guarantee that scene processing such as collision detection and radiographic testing normally works.

The safety distance is an extension distance set to guarantee that scene processing such as collision detection and radiographic testing in the virtual plot normally works. The safety distance is required to be applied to the initial segmentation boundary. That is, the initial segmentation boundary is required to be extended towards a periphery or in a specific direction by means of the safety distance, such that the initial segmentation boundary is enlarged and the target segmentation boundary is obtained.

Figure 8:
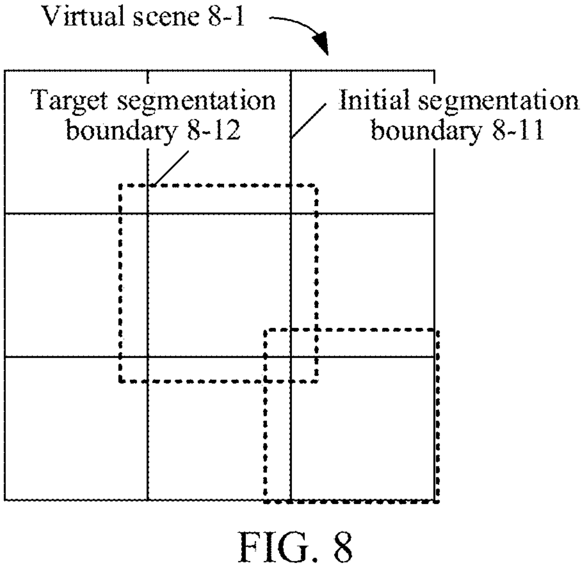
FIG. 8 is a schematic diagram of a target segmentation boundary according to an aspect of the disclosure.

For example, FIG. 8 is a schematic diagram of a target segmentation boundary according to an aspect of the disclosure. A length of each side of virtual scene 8-1 is N km. The management device first determines initial segmentation boundary 8-11 for virtual scene 8-1 to equal scale, then extends the initial segmentation boundary towards a periphery by means of a safety distance, and obtains target segmentation boundary 8-12. The virtual plot obtained based on target segmentation boundary 8-12 is greater than the virtual plot obtained based on initial segmentation boundary 8-11.

S303: The management device segments the virtual scene according to the target segmentation boundary, and obtains a plurality of virtual plots.

In some aspects, the size of the virtual plot is equal to the size of the target segmentation boundary. The virtual plot obtained based on the target segmentation boundary can guarantee that scene processing such as collision detection and radiographic testing normally works.

S304: The management device exports a plot data file corresponding to each virtual plot, and issues the plot data file corresponding to the virtual plot to the plurality of scene devices.

In some aspects, after obtaining a plurality of virtual plots, the management device traverses an object in each virtual plot, exports (exports one virtual plot for one plot data file) data of a collision body model corresponding to each object or a simplified model corresponding to the collision body model of the object, and therefore obtain a plot data file of each virtual plot. Finally, the management device transmits the plot data files of the plurality of virtual plots to the plurality of scene devices. Herein, the management device may transmit the plot data files of all the virtual plots for each scene device, or may transmit the plot data files of the virtual plots that are required to be subsequently loaded for each scene device, which is not limited in an aspect of the disclosure.

In some aspects of the disclosure, the above operation of exporting a plot data file corresponding to each virtual plot, that is, a specific process of S304 may be implemented through a method as follows: select a to-be-simplified object from a plurality of objects in each virtual plot; simplify the collision body model of the to-be-simplified object, and obtain a simplified model; and export data of the simplified model and collision body models of the objects other than the to-be-simplified object of the plurality of objects, and obtain a plot data file corresponding to each virtual plot.

In some aspects, the above to-be-simplified object refers to an object, which can be simplified by the collision body model of the object, of the plurality of objects in the virtual plot.

Each virtual plot has a plurality of objects. Some to-be-simplified objects (collision body models of which have some detail contents having complex structures and concentrated collision information, such as leaves of trees and leaves of bushes) that can be subjected to collision body simplification exist in these objects. When exporting the data, the management device can simplify the collision body models of the to-be-simplified objects so as to obtain the simplified models that do not affect accuracy of scene processing and simplify the detail contents (which are required to occupy some storage resources) having complex structures and concentrated collision information, export data of the simplified models of the to-be-simplified objects and collision body models of other objects that cannot be simplified, and obtain the plot data file of each virtual plot.

In some aspects, structural complexity of the collision body model of the to-be-simplified object is greater than a complexity threshold, and an information amount of collision information is greater than an information amount threshold.

Figure 9:
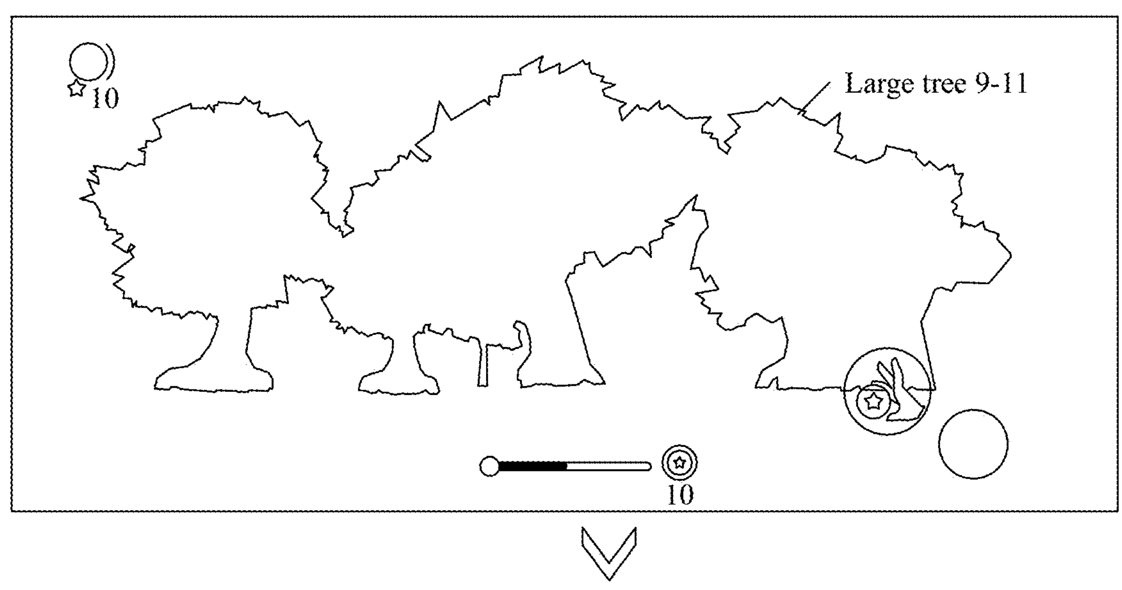
FIG. 9 is a schematic diagram of a to-be-simplified object and a collision body model corresponding thereto according to an aspect of the disclosure.
Figure 9:
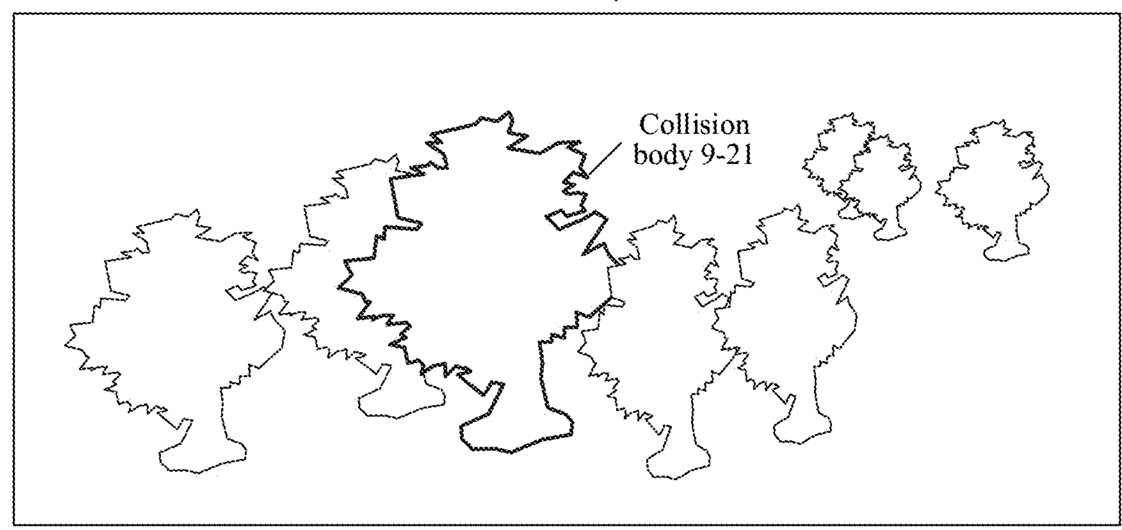

For example, FIG. 9 is a schematic diagram of a to-be-simplified object and a collision body model corresponding thereto according to an aspect of the disclosure. Some large trees 9-11 exist in the virtual plot shown in interface 9-1. Leaf details of these trees do not affect accuracy of collision detection and radiographic testing, but local complex details of these trees increase complexity of collision body 9-21 models corresponding to the trees in interface 9-2. Therefore, the management device can take large trees 9-11 as the to-be-simplified objects, that is, collision bodies 9-21 of the large trees are collision body models corresponding to the to-be-simplified objects, which are required to be simplified.

In some aspects of the disclosure, the specific process that the management device selects the to-be-simplified object from a plurality of objects in each virtual plot may be implemented through processing as follows: select a to-be-detected (or candidate) object of which center coordinates are not located in the virtual plot from the plurality of objects of each virtual plot; detect collision between the to-be-detected object and an enclosure region corresponding to the virtual plot, and obtain a collision result; and when the collision result indicates that the to-be-detected object hits the enclosure region, select the to-be-simplified object from the to-be-detected object.

In some aspects, the above operation of selecting a to-be-detected object of which center coordinates are not located in the virtual plot from the plurality of objects of each virtual plot may be implemented through a method as follows: acquire center coordinates of each object in each virtual plot and a coordinate range of each virtual plot; compare each center coordinate with the coordinate range, and obtain a comparison result of each object; when the comparison result of the object indicates that the center coordinates are not located in the coordinate range, determine the object as a to-be-detected object that is not located in the virtual plot.

In some aspects, the collision detection is a processing process of determining whether the to-be-detected object collides with the enclosure region. The collision detection is used to determine whether the to-be-detected object occupies a space in the virtual plot.

Some huge objects, such as mountains and lakes, exist in the virtual scene. These objects occupy two or more virtual plots, but center coordinates of the objects exist in only one virtual plot (the object has only one center coordinate pair). Therefore, if data of each virtual plot is exported only based on the center coordinates, data of the huge objects is likely to be lost (for example, there are mountain data in the plot data file of the virtual plot at which the center coordinates of the mountain are located, but there are no mountain data in the plot data files of the other virtual plots). Therefore, the management device is first required to find out, from the center coordinates of a plurality of objects of each virtual plot, the objects of which center coordinates are not located in the virtual plot, take these objects as to-be-detected objects, detect collision between the enclosure region of the virtual plot and the to-be-detected objects, and therefore determine, by means of collision results, whether the to-be-detected objects occupy spaces in the virtual plot. When the collision result indicates that the to-be-detected object hits the enclosure region, that is, collides with the enclosure region, it indicates that the to-be-detected object occupies a space in the virtual plot. Therefore, when subsequently traversing the objects, the management device also include the to-be-detected object, that is, determine whether the to-be-detected object can be subjected to model reduction, and select the object that can be subjected to model reduction from the to-be-detected objects as the to-be-simplified object.

The collision detection in an aspect of the disclosure can be implemented through any existing collision detection technology, which is not limited in an aspect of the disclosure.

In some aspects of the disclosure, a specific process that the management device simplifies a collision body model of a to-be-simplified object, and obtains a simplified model may be implemented through processing as follows: determine a to-be-replaced portion for the to-be-simplified object, where the to-be-replaced portion includes a portion having complex details and concentrated collision information; determine a corresponding replacement model portion for the to-be-replaced portion; simplify the collision body model of the to-be-simplified object by means of the replacement model portion; and obtain a simplified model.

The complex detail may mean that the complexity exceeds a complexity threshold. The concentrated collision information may mean that a size of a region in which the collision information is located is less than a size threshold. The complexity can be computed by the management device according to a quantity of sharp corners, texture images, etc. of each portion of the to-be-simplified object. A region where the collision information is located may be obtained based on coordinates of a collision point. For example, a closed curved surface is fitted based on coordinates of an outermost collision point, and a region delimited by the closed curved surface is determined as the region where the collision information is located.

The replacement model portion refers to a model portion of which complexity is less than that of the to-be-replaced portion and of which a size of a region where collision information is located is greater than that of the to-be-replaced portion. Moreover, a similarity degree of shapes of the replacement model portion and an original model portion of a to-be-replaced portion is greater than a similarity degree threshold. Alternatively, the replacement model portion refers to a model portion having collision information, where a similarity degree between the collision information and collision information of the original model portion of the to-be-replaced portion reaches a similarity degree threshold. In an aspect of the disclosure, the replacement model portion may be obtained by finding a model closest to the to-be-replaced portion from a preset replacement model library, or by obfuscating details of the to-be-replaced portion.

Figure 10:
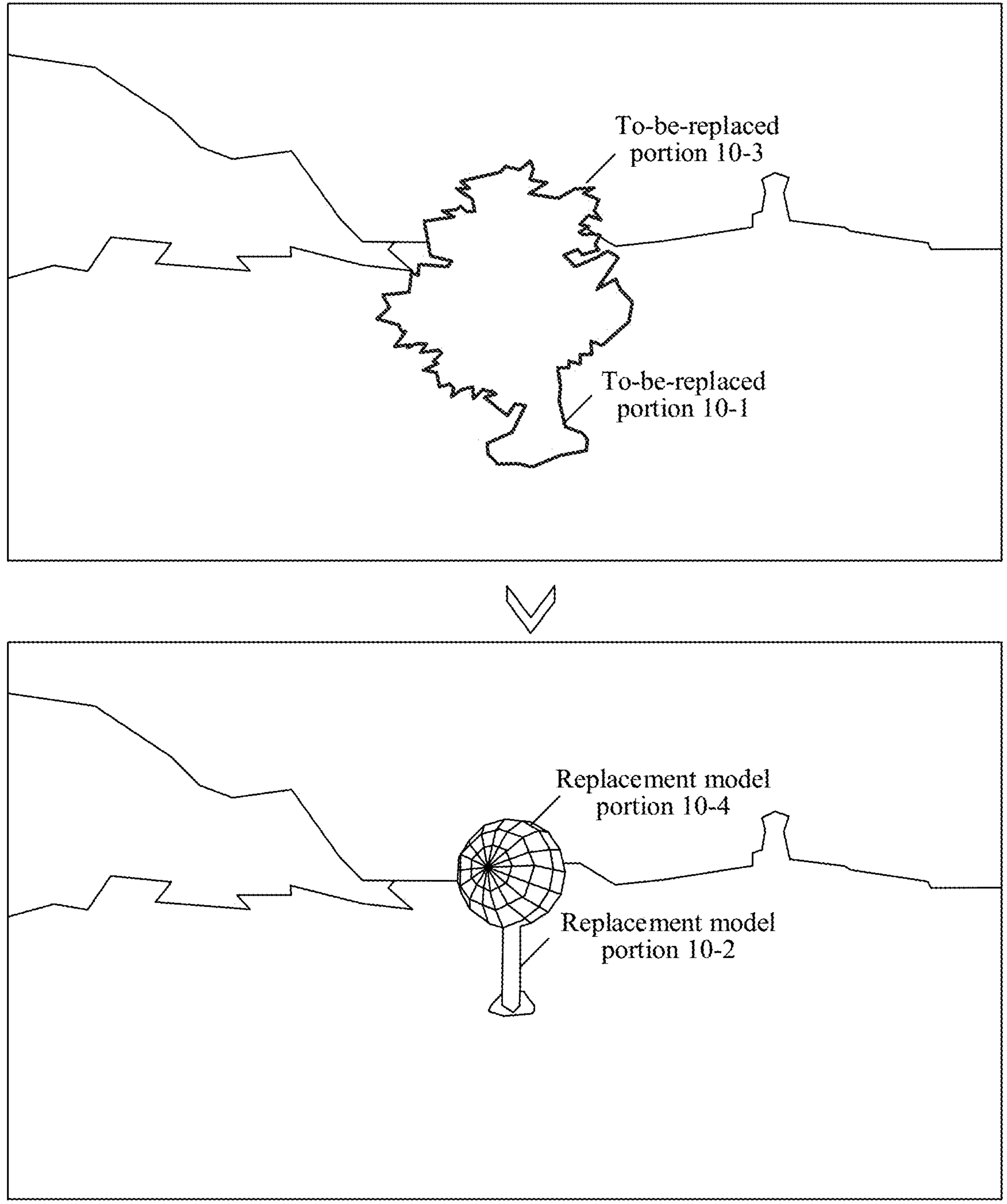
FIG. 10 is a schematic diagram of a replacement model portion according to an aspect of the disclosure.

For example, FIG. 10 is a schematic diagram of a replacement model portion according to an aspect of the disclosure. When to-be-replaced portion 10-1 is a trunk of a large tree, replacement model portion 10-2 may be a cylinder. When to-be-replaced portion 10-3 is a canopy of a large tree, replacement model portion 10-4 may be a sphere. In this way, the management device may be replaced with a simplified model of a cylinder and a sphere for a collision body model of a large tree.

Compared with the related art in which when an object having a complex structure and concentrated collision information is generated with high accuracy, a storage space occupied by a landscape data file will be drastically increased (in a square increasing mode); and when the object is generated with low accuracy, accuracy of collision detection will be adversely affected, etc., an aspect of the disclosure has effects that the management device generates a simplified model for an object having details having a complex structure and concentrated collision information, and reduces a data amount of the object by means of the simplified model, thereby greatly reducing a size of the exported plot data file.

In some aspects of the disclosure, a process that the scene device carries out scene processing on the virtual plot and obtains a processing result, that is, a specific process of 108 may be implemented through processing as follows: carry out collision detection and radiographic testing on an object in the virtual plot and obtain the processing result.

That is, in an aspect of the disclosure, scene processing may be implemented through collision detection and radiographic testing. The obtained processing result includes a collision detection result and a radiographic testing result. The collision detection in an aspect of the disclosure may be implemented based on any one of existing collision detection technologies (such as those provided by a Unity engine and a Cocos engine). The radiographic testing may be implemented based on any one of existing radiographic testing technologies (such as those provided by the Unity engine and the Cocos engine), which is not limited in an aspect of the disclosure.

An illustrative application of an aspect of the disclosure in a practical application scene will be described below.

An aspect of the disclosure is implemented when a scenes (virtual scene) in an open world game is managed.

In an aspect of the disclosure, a scene may be segmented to certain scale. With FIG. 8 as an example, a scene having a side length of 9 km and a total area of 81 square kilometers may be divided into 9 regions to equal scale. Then, at a boundary region, to guarantee normal collision detection and radiographic testing, a safety boundary (target segmentation boundary) may be set. That is, an additional region of 100 meters (safety distance) is exported on each side. Through such a method, the scene is exported into 9 plot files (plot file data). Each plot file corresponds to a plot (virtual plot) of 9 to 10.2 square kilometers, and the 9 files are loaded by 9 scene servers (scene devices) (in this case, each scene server only loads 1 file). In this way, overhead of loading and running a scene by the scene server can be greatly reduced.

Figure 11:
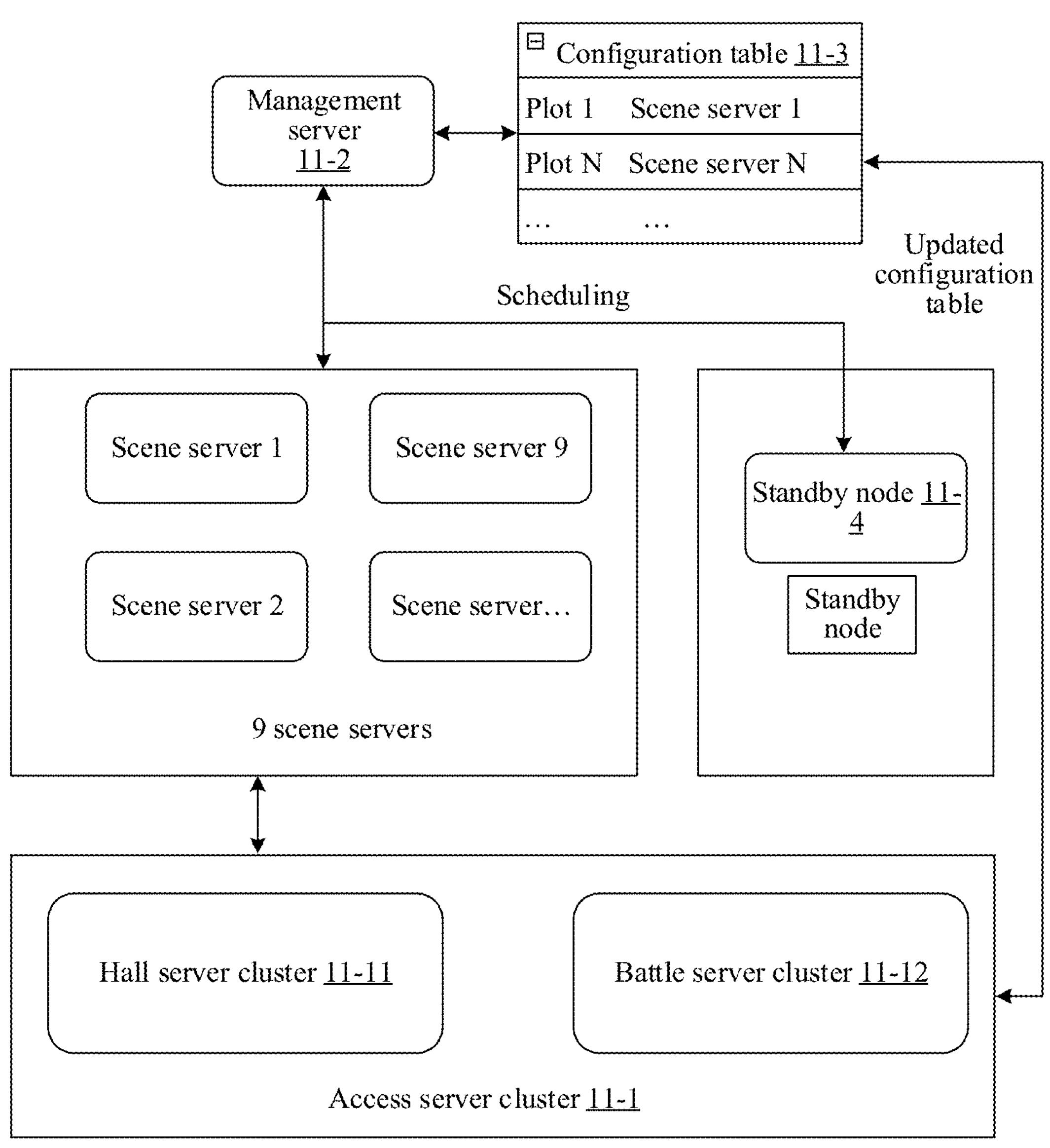
FIG. 11 is a system architecture diagram of managing a scene in a game according to an aspect of the disclosure.

FIG. 11 is a system architecture diagram of managing a scene in a game according to an aspect of the disclosure. With reference to FIG. 11, the system architecture includes access server cluster 11-1 (service devices), scene server 1, scene server 2 to scene server 9, management server 11-2 (management device), and standby node 11-4 (standby device). Access server cluster 11-1 includes hall server cluster 11-11 and battle server cluster 11-12. Access server cluster 11-1 is a visitor of 9 scene servers, that is, scene servers 1-9. Scene server 1 to scene server 9 load the above 9 plot files, such that the entire scene is managed by the 9 scene servers together. The 9 scene servers are managed and scheduled by management server 11-2. When any one of the 9 scene servers malfunctions, scheduling switch can be carried out by management server 11-2, such that the scene is guaranteed to be normally loaded and run.

In more detail, the management server is responsible for maintaining a configuration table (loading configuration information). With reference to FIG. 11, configuration table 11-3 stores a corresponding relation between each plot and scene server. The management server keeps a heartbeat with all scene servers. Therefore, when being started up, each scene server is in communication with the management server (by means of a start-up message), knows a to-be-loaded plot (by means of a first loading message) and carries out loading. If a scene server malfunctions, the management server schedules a standby node for replacement. For example, when scene server 5 malfunctions, the management server asks the standby node to replace scene server 5 and asks the access server cluster, that is, the hall server cluster and the battle server cluster to update the configuration table (obtain updated configuration information).

The hall server cluster is responsible for virtual activities, virtual mailboxes, virtual backpacks, etc. and service logic processing not related to virtual scenes of players, transmits requests to the scene servers, and receives configuration tables synchronized by the management server.

The battle server cluster is responsible for all virtual battle logic processing, transmits requests to the scene servers, and receives configuration tables synchronized by the management server.

Scene servers 1-9 are configured to be responsible for collision detection and radiographic testing of the plot loaded thereby, load only 1 plot when running, and maintain heartbeats with the management server.

The standby node maintains plot files of 9 plots in a storage space, does not actively load the plot files when running, loads required plots only when receiving loading commands (second loading messages) from the management server, and maintains a heartbeat with the management server.

Figure 12:
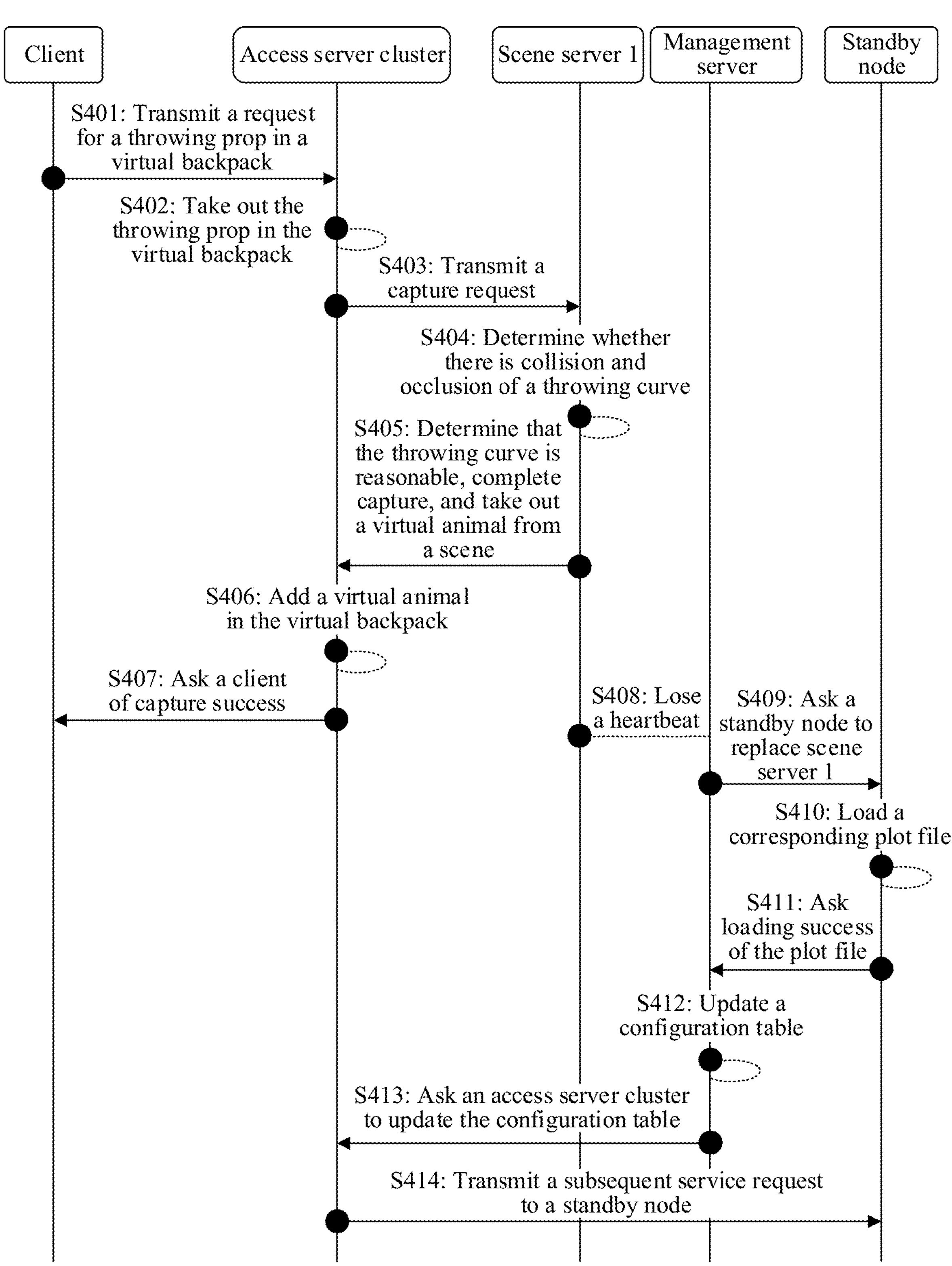
FIG. 12 is a work flow diagram of managing a scene according to an aspect of the disclosure.

FIG. 12 is a work flow diagram of managing a scene according to an aspect of the disclosure. With reference to FIG. 12, the flow may include:

S401: A client (terminal) transmits a request (operation processing request) for a throwing prop in a virtual backpack. The prop is configured to capture a virtual animal in a scene.

S402: An access server cluster takes out the throwing prop in the virtual backpack.

S403: The access server cluster transmits a capture request (scene processing request).

S404: Scene server 1 determines whether there is collision and occlusion of a throwing curve.

S405: Scene server 1 determines that the throwing curve is proper, completes capture, and takes out the virtual animal (processing result) in the scene.

S406: The access server cluster adds a virtual animal in the virtual backpack.

S407: The access server cluster asks the client of capture success (notification message).

S408: Scene server 1 loses a heartbeat with the management server.

S409: The management server asks a standby node to replace scene server 1 (referred to as a malfunctioning scene device in this case).

S410: The standby node loads a corresponding plot file.

S411: The standby node asks loading success (loading success message) of the plot file.

S412: The management server updates a configuration table, that is, changes scene server 1 into the standby node.

S413: The management server asks the access server cluster to update the configuration table.

S414: The access server cluster transmits a subsequent service request to the standby node.

In a normal sequence of work, when meeting the virtual animal in the scene, a player may capture the virtual animal by means of the throwing prop in the virtual backpack, for example, capture the virtual animal by hitting the virtual animal by means of the throwing prop. In such a flow, collision detection is required at scene server 1. If the player is located at a boundary between plot 1 and plot 2, coordinates of the player are located in plot 1 and the virtual animal is located in plot 2, collision detection will be carried out in scene server 1 (since scene server 1 loads a region in plot 2, detection can be normally carried out). After the player enters plot 2, a subsequent operation is carried out in scene server 2. If the player frequently moves at the boundary between plot 1 and plot 2, to avoid frequent server switch, an excessive value may be set in an aspect of the disclosure. That is, after the player enters plot 2 from plot 1 by more than 10 meters, hosting by scene server 2 is carried out for management. Therefore, the problem of frequent switch caused by movement can be solved.

When a malfunction occurs, that is, the heartbeat of scene server 1 and the management server is lost, the management server determines that scene server 1 is fixed, such that a standby node is asked to replace scene server 1 to load the plot file corresponding to plot 1. The standby node asks the management server after loading succeeds. After receiving the notification, the management server updates the configuration table and synchronizes the configuration table to the hall server cluster and the battle server cluster in the access server cluster. Subsequent requests for plot 1 are all transmitted to the standby node for processing. For a more efficient use of the memory, the standby node may store data of 9 plot files in the storage space, but only load the specified plot file when receiving a notification from the management server.

In an aspect of the disclosure, the management server is required to export a corresponding plot file for each plot. In this case, the management server may generate a corresponding proxy model (simplified model) for an object (to-be-simplified object) in a scene that has locally complex details and concentrated collision information, such that storage resources are saved. For example, in cases of collision bodies of trees having complex details in the scene, a trunk may be simplified into a cylinder and a canopy is simplified into a sphere. Since a fraction of trees in the scene is typically high, the size of the plot file can be greatly reduced by means of the proxy model.

Figure 13:
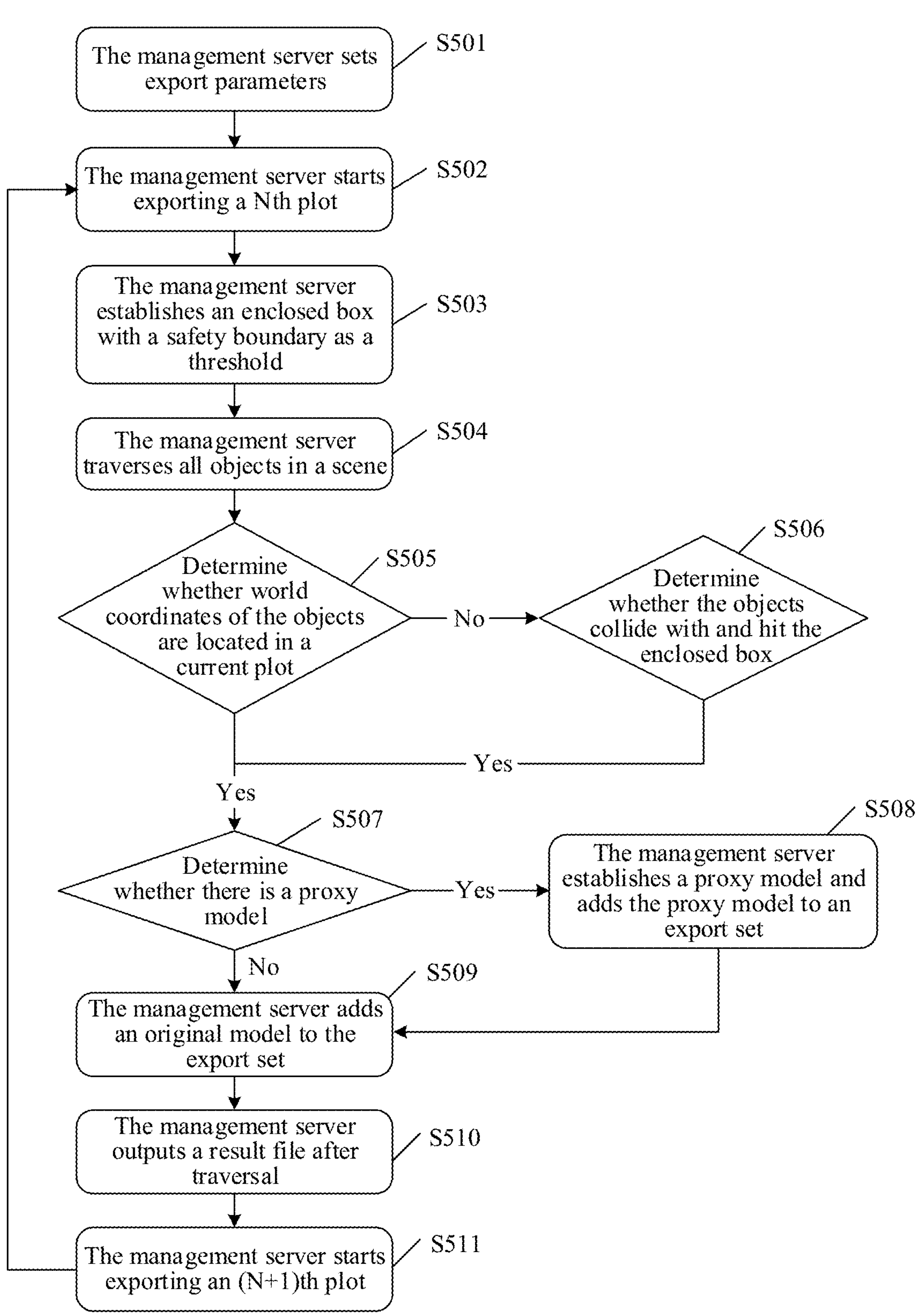
FIG. 13 is a schematic flow diagram of exporting a plot file according to an aspect of the disclosure.

For example, FIG. 13 is a schematic flow diagram of exporting a plot file according to an aspect of the disclosure. The process may include:

S501: The management server sets export parameters.

The export parameters may include a block length of a square and a security boundary threshold.

S502: The management server starts exporting a Nth plot. In the operation, N starts from 1 until all plots are processed.

S503: The management server establishes an enclosed box (enclosure region) with a security boundary as a threshold.

S504: The management server traverses all objects in the scene.

S505: The management server determines whether world coordinates of the objects are located in a current plot. If yes, S507 is executed; and otherwise, S506 is executed.

S506: The management server determines whether the objects collide with and hit the enclosed box. If yes, S507 is executed; and otherwise, no processing is executed.

The operation is to avoid a case that through direct segmentation, enclosed boxes of some large objects are located at the current plot, but world coordinates are no located at the current plot, such that transmitted data is lost when the objects are traversed. These objects can be detected through collision detection on the objects by means of enclosed boxes.

S507: The management server determines whether there is a proxy model. If yes, S508 is executed; and otherwise, S509 is executed.

In this case, whether there is a proxy model can be determined by means of names of the objects. For example, specific character strings exit at names of the objects such as "tall trees" and "short shrubs". An object having specific character string "SM_EnGra" in the name of the object is a proxy model.

S508: The management server establishes a proxy model and adds the proxy model to an export set.

S509: The management server adds an original model to the export set.

S510: The management server outputs a result file after traversal.

S511: The management server starts exporting an (N+1)th plot.

In this case, the management server can export the plot files.

In an aspect of the disclosure, data relating to user information, such as an operation processing request is involved. When an aspect of the disclosure is applied to a specific product or technology, user permission or consent is required to be obtained. Collection, use and processing of relevant data are required to comply with relevant laws, regulations and standards of relevant countries and regions.

An illustrative structure in which implementation of the first apparatus 255 configured to process a virtual scene provided in an aspect of the disclosure is a software module will be continued to be described below. In some aspects, as shown in FIG. 2, a schematic structural diagram of a first server according to an aspect of the disclosure is shown in FIG. 2. A software module in the first apparatus 255 for processing a virtual scene stored in the first memory 250 may include:

a plot allocation module 2551, configured to allocate a to-be-loaded virtual plot to each scene device from a plurality of virtual plots in response to start-up messages transmitted by a plurality of scene devices; where the plurality of the virtual plots are obtained by segmenting the virtual scene; and a first transmission module 2552, configured to transmit a first loading message to each scene device, where the first loading message is used for the scene device to load a plot data file of the to-be-loaded virtual plot; and transmit loading configuration information to a service device, where the loading configuration information records a virtual plot belonging to each scene device and is used for the service device to determine a scene device matching an operation processing request and transmit, based on the operation processing request, a scene processing request to the matching scene device.

In some aspects of the disclosure, the first apparatus 255 configured to process a virtual scene further includes: a malfunction detection module 2553 and a first reception module 2554.

The malfunction detection module 2553 is configured to detect a connection to each scene device, and obtain a detection result corresponding to each scene device; where the detection result indicates whether a connection to the scene device is broken; and select, based on the detection result, a malfunctioning scene device from the plurality of scene devices; where the malfunctioning scene device includes a disconnected scene device.

The first transmission module 2552 is further configured to transmit a second loading message to a standby device according to a to-be-loaded virtual plot corresponding to the malfunctioning scene device. The second loading message is used to trigger the standby device to load a plot data file of the to-be-loaded virtual plot corresponding to the malfunctioning scene device.

The first reception module 2554 is configured to update the loading configuration information in response to a loading success message transmitted by the standby device.

The first transmission module 2552 is further configured to transmit updated configuration information to the service device. The updated configuration information is used to trigger the service device to determine the scene device matching the operation processing request.

In some aspects of the disclosure, the first apparatus 255 for processing a virtual scene further includes: a data export module 2555, configured to determine an initial segmentation boundary for the virtual scenes, adjust the initial segmentation boundary by means of a safety distance, obtain a target segmentation boundary, segment the virtual scene according to the target segmentation boundary, obtain a plurality of the virtual plots, export a plot data file corresponding to each virtual plot, and issue the plot data file corresponding to the virtual plot to the plurality of scene devices.

In some aspects of the disclosure, the data export module 2555 is further configured to select a to-be-simplified object from a plurality of objects in each virtual plot, simplify the collision body model of the to-be-simplified object, obtain a simplified model, export data of the simplified model and collision body models of the objects other than the to-be-simplified object of the plurality of objects, and obtain a plot data file corresponding to each virtual plot.

In some aspects of the disclosure, the data export module 2555 is further configured to select a to-be-detected object of which center coordinates are not located in the virtual plot from the plurality of objects of each virtual plot, detect collision between the to-be-detected object and an enclosure region corresponding to the virtual plot, obtain a collision result, and select the to-be-simplified object from the to-be-detected objects when the collision result indicates that the to-be-detected object hits the enclosure region.

In some aspects of the disclosure, the data export module 2555 is further configured to determine a to-be-replaced portion for the to-be-simplified object, where the to-be-replaced portion includes a portion having complex details and concentrated collision information, determine a corresponding replacement model portion for the to-be-replaced portion, simplify the collision body model of the to-be-simplified object by means of the replacement model portion, and obtain a simplified model.

With reference to FIG. 3, a schematic structural diagram of a second server according to an aspect of the disclosure is shown in FIG. 3. An illustrative structure in which implementation of the first apparatus 555 configured to process a virtual scene provided in an aspect of the disclosure is a software module will be continued to be described below. In some aspects, as shown in FIG. 3, the software modules in the second apparatus 555 stored in the second memory 550 may include:

a second reception module 5551, configured to receive loading configuration information transmitted by a management device; where the loading configuration information records a virtual plot belonging to each scene device;

a device determination module 5552, configured to determine, in response to an operation processing request transmitted by a terminal and based on the loading configuration information, a scene device matching the operation processing request from scene devices corresponding to a plurality of virtual plots; where the plurality of the virtual plots are obtained by segmenting the virtual scene;

a second transmission module 5553, configured to transmit a scene processing request to the scene device matching the operation processing request;

the second reception module 5551, further configured to receive a processing result, returned by the scene device matching the operation processing request, for the scene processing request; and the second transmission module 5553, further configured to return, based on the processing result, a notification message to the terminal.

In some aspects of the disclosure, the second reception module 5551 is further configured to receive updated configuration information transmitted by the management device.

The device determination module 5552 is further configured to determine, in response to the operation processing request transmitted by the terminal and based on the update configuration information, the scene device matching the operation processing request. A malfunctioning scene device of the plurality of scene devices is replaced with a standby device in the updated configuration information.

With reference to FIG. 4, a schematic structural diagram of a third server according to an aspect of the disclosure is shown in FIG. 4. An illustrative structure in which implementation of the third apparatus 655 configured to process a virtual scene provided in an aspect of the disclosure is a software module will be continued to be described below. In some aspects, as shown in FIG. 4, the software modules in the third apparatus 655 stored in the third memory 650 may include:

a third transmission module 6551, configured to transmit a start-up message to a management device in response to a start-up operation;

a third reception module 6552, configured to receive a first loading message, returned by the management device, for the start-up message;

a data loading module 6553, configured to acquire a plot data file of a to-be-loaded virtual plot in response to the first loading message, and load the plot data file; where the to-be-loaded virtual plot is one of a plurality of virtual plots obtained by segmenting the virtual scene;

the third reception module 6552, further configured to receive a scene processing request transmitted by a service device;

a scene processing module 6554, configured to carry out scene processing on the virtual plot in response to the scene processing request, and obtain a processing result; and the third transmission module 6551, further configured to return the processing result to the service device.

In some aspects of the disclosure, the scene processing module 6554 is further configured to carry out collision detection and radiographic testing on an object in the virtual plot, and obtain the processing result.

An aspect of the disclosure provides a system for processing a virtual scene. The processing system includes a management device, a service device and a scene device. The management device is configured to implement a method for processing a virtual scene on a management device side provided in an aspect of the disclosure. The service device is configured to implement a method for processing a virtual scene on a service device side provided in an aspect of the disclosure. The scene device is configured to implement a method for processing a virtual scene on a scene device side provided in an aspect of the disclosure.

An aspect of the disclosure provides a computer program product. The computer program product includes a computer program or a computer-executable instruction. The computer program or the computer-executable instruction is stored in a computer-readable storage medium. A first processor, a second processor and a third processor of a computing device (any possible implementation of a management device, a service device and a scene device) reads the computer-executable instruction from the computer-readable storage medium. The first processor executes the computer-executable instruction to cause the computing device to execute a method for processing a virtual scene on a management device side provided in an aspect of the disclosure. The second processor executes the computer-executable instruction to cause the computing device to execute a method for processing a virtual scene on a service device side provided in an aspect of the disclosure. The third processor executes the computer-executable instruction to cause the computing device to execute a method for processing a virtual scene on a scene device side provided in an aspect of the disclosure.

An aspect of the disclosure provides a computer-readable storage medium having a computer-executable instruction stored therein. When executed by a first processor, the computer-executable instruction will cause the first processor to execute a method for processing a virtual scene on a management device side provided in an aspect of the disclosure. When executed by a second processor, the computer-executable instruction will cause the second processor to execute a method for processing a virtual scene on a service device side provided in an aspect of the disclosure. When executed by a third processor, the computer-executable instruction will cause the third processor to execute a method for processing a virtual scene on a scene device side provided in an aspect of the disclosure.

In some aspects, the computer-readable storage medium may be a ferroelectric random access memory (FRAM), a read only memory (ROM), a programmable read only memory (PROM), an erasable programmable read-only memory (EPROM), an electrically erasable programmable read only memory (EEPROM), a flash memory, a magnetic surface memory, an optical disc, or a compact disc read only memory (CD-ROM), and other memories, or various devices including one or any combination of the above memories.

In some aspects, the executable instruction may be in the form of a program, software, a software module, a script or a code, is written in any form of programming languages (including compiled or interpreted languages, or declarative or procedural languages), and can be deployed in any form, for example, deployed as a stand-alone program, a module, a component, a subroutine, or other unit suitable for being used in a computing environment.

As an example, the executable instruction may but does not certainly correspond to a file in a file system, may be stored as a portion of a file that stores other programs or data, for example, stored in one or more scripts in a hyper text markup language (HTML) document, stored in a single file dedicated to the described program, or stored in a plurality of coordinated files (such as files that store one or more modules, subprograms or codes).

As an example, the executable instruction can be deployed to be executed on one computing device or on a plurality of computing devices located at a site, or distributed on a plurality of sites to be executed by a plurality of computing devices interconnected by means of a communication network.

In summary, aspects of the disclosure have beneficial effects as follows:

(1) Since a map range of the virtual plot is much less than a map range of the entire virtual scene and a quantity of objects included in the virtual plot is less than a quantity of objects of the entire virtual scene, by segmenting the virtual scene into a plurality of virtual plots and loading the plurality of virtual plots in parallel by means of a plurality of scene devices, each scene device can manage the virtual plot with high management efficiency by only requiring less memory overhead. Finally, memory overhead caused when the virtual scene is processed is effectively reduced and processing efficiency of the virtual scenes is improved. When a scene device malfunctions, the malfunctioning scene device can be replaced with a standby device, such that a disaster tolerance mechanism for a processing process of the virtual scene is implemented, and the virtual scene can be more reliably and stably processed. A simplified model is generated for an object having details having a complex structure and concentrated collision information, and a data amount of the object is reduced by means of the simplified model, thereby greatly reducing a size of the exported plot data file.

(2) The plurality of virtual plots are obtained by segmenting the virtual scene, and the to-be-loaded virtual plot for each scene device is one of the plurality of virtual plots. That is, in an aspect of the disclosure, a scene device loads only one virtual plot (the virtual plot can be understood as part of the virtual scene) in the virtual scene. However, map extent of the virtual plot is certainly much less than map extent of the entire virtual scene and is required to take up only small memory overhead.

(3) A management device allocates a plurality of virtual plots obtained by segmenting a virtual scene to a plurality of scene devices. Each scene device is asked, by means of a first loading message, to load a to-be-loaded virtual plot. By transmitting loading configuration information to a service device, the service device can find, based on the loading configuration information, a corresponding scene device from the plurality of scene devices running in parallel, so as to carry out scene processing. Since a map range of the virtual plot is much less than a map range of the entire virtual scene and a quantity of objects included in the virtual plot is less than a quantity of objects of the entire virtual scene, by segmenting the virtual scene into a plurality of virtual plots and loading the plurality of virtual plots in parallel by means of a plurality of scene devices, each scene device can manage the virtual plot with high management efficiency by only requiring less memory overhead. Finally, memory overhead of the virtual scenes is effectively reduced, and processing efficiency of the virtual scenes is improved.

(4) A plot data file of each virtual plot may be stored in advance in the standby device such that the standby device can rapidly replace, when a scene device malfunctions, the malfunctioning scene device to process the virtual scene. The standby device can also pull the plot data file of the to-be-loaded virtual plot of the malfunctioning scene device from the management device in real time such that a storage space of the standby device can be saved.

(5) The management device can replace, when a scene device malfunctions, the malfunctioning scene device with a standby device, so as to implement a disaster tolerance mechanism for a processing process of the virtual scene such that the virtual scene can be more reliably and stably processed.

(6) The safety distance is an extension distance set to guarantee that scene processing such as collision detection and radiographic testing in the virtual plot normally works. The safety distance is required to be applied to the initial segmentation boundary. That is, the initial segmentation boundary is required to be extended towards a periphery or in a specific direction by means of the safety distance, such that the initial segmentation boundary is enlarged and the target segmentation boundary is obtained.

(7) The management device generates a simplified model for an object having details having a complex structure and concentrated collision information, and reduces a data amount of the object by means of the simplified model, thereby greatly reducing a size of the exported plot data file.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A method for processing a virtual scene, the method comprising:

segmenting the virtual scene into plural virtual plots, each of the plural virtual plots having a respective fixed plot area of the virtual scene;

allocating each of the plural virtual plots to a different one of plural scene devices in response to start-up messages transmitted by the plural scene devices;

transmitting a first loading message to two or more scene devices of the plural scene devices, the first loading message instructing the two or more scene devices to load in parallel, into respective memories of the two or more scene devices, plot data files of the plural virtual plots respectively allocated to each of the two or more scene devices; and transmitting loading configuration information to a service device configured to respond to operation requests from a terminal device displaying the virtual scene, the loading configuration information indicating which scene device of the plural scene devices is allocated to each virtual plot and enabling the service device to determine a scene device of the plural scene devices allocated to a virtual plot included in an operation request from the terminal device and transmit, based on the operation request, a scene request to the scene device allocated to the virtual plot included in the operation request.

2. The method according to claim 1, wherein the method further comprises:

detecting that a scene device of the plural scene devices is disconnected;

transmitting a second loading message to a standby device according to a virtual plot of the plural virtual plots corresponding to the disconnected scene device, wherein the second loading message instructs the standby device to load a plot data file of the virtual plot corresponding to the disconnected scene device; and updating the loading configuration information when a loading success message is received from the standby device, and transmitting updated configuration information to the service device to determine the scene device allocated to the virtual plot included in the operation request from the terminal device.

3. The method according to claim 1, the method further comprises:

determining an initial segmentation boundary of the virtual scene;

adjusting the initial segmentation boundary according to a safety distance, and obtaining a final segmentation boundary;

segmenting the virtual scene according to the final segmentation boundary, and obtaining the plurality of the virtual plots; and exporting a plot data file corresponding to each virtual plot, and respectively issuing the plot data file corresponding to each virtual plot to allocated scene devices.

4. The method according to claim 3, wherein the exporting the plot data file comprises:

selecting an object from a plurality of objects in each respective virtual plot;

simplifying a collision body model of the object, and obtaining a simplified model; and exporting data of the simplified model of the object and collision body models of other objects of the plurality of objects as the plot data file corresponding to each respective virtual plot.

5. The method according to claim 4, wherein the selecting the object comprises:

selecting a candidate object having center coordinates not located in the respective virtual plot from the plurality of objects in the respective virtual plot;

detecting collision between the candidate object and a boundary corresponding to the respective virtual plot, and obtaining a collision result; and selecting the candidate object as the object when the collision result indicates that the candidate object hits the boundary.

6. The method according to claim 4, wherein the simplifying comprises:

determining a to-be-replaced portion of the object; and determining a replacement model portion corresponding to the to-be-replaced portion, simplifying the collision body model of the object using the replacement model portion, and obtaining the simplified model.

7. The method according to claim 1, wherein the service device is a server connected to the terminal device, and the plural scene devices are servers each connected to the service device and configured to transmit a plot data file to the service device in response to a scene request received from the service device.

8. An apparatus for processing a virtual scene, the apparatus comprising:

processing circuitry configured to segment the virtual scene into plural virtual plots, each of the plural plots having a respective fixed plot area of the virtual scene;

allocate each of the plural virtual plots to a different one of plural scene devices in response to start-up messages transmitted by the plural scene devices;

transmit a first loading message to two or more scene devices of the plural scene devices, the first loading message instructing the two or more scene devices to load in parallel, into respective memories of the two or more scene devices, plot data files of the plural virtual plots respectively allocated to each of the two or more scene device; and transmit loading configuration information to a service device configured to respond to operation requests from a terminal device that displays the virtual scene, the loading configuration information indicating which scene device of the plural scene devices is allocated to each virtual plot and enabling the service device to determine a scene device of the plural scene devices allocated to a virtual plot included in an operation request from the terminal device and transmit, based on the operation request, a scene request to the scene device allocated to the virtual plot included in the operation request.

9. The apparatus according to claim 8, wherein the processing circuitry is further configured to:

detect that to a scene device of the plural scene devices is disconnected;

transmit a second loading message to a standby device according to a virtual plot of the plural virtual plots corresponding to the disconnected scene device, wherein the second loading message instructs the standby device to load a plot data file of the virtual plot corresponding to the disconnected scene device; and update the loading configuration information when a loading success message is received from the standby device, and transmit updated configuration information to the service device to determine the scene device allocated to the virtual plot included in the operation request from the terminal device.

10. The apparatus according to claim 8, wherein the processing circuitry is further configured to:

determine an initial segmentation boundary of the virtual scene;

adjust the initial segmentation boundary according to a safety distance, and obtain a final segmentation boundary;

segment the virtual scene according to the final segmentation boundary, and obtain the plurality of the virtual plots; and export a plot data file corresponding to each virtual plot, and respectively issue the plot data file corresponding to each virtual plot to allocated scene devices.

11. The apparatus according to claim 10, wherein the processing circuitry is further configured to:

select an object from a plurality of objects in each respective virtual plot;

simplify a collision body model of the object, and obtain a simplified model; and export data of the simplified model of the object and collision body models of other objects of the plurality of objects as the plot data file corresponding to each respective virtual plot.

12. The apparatus according to claim 11, wherein the processing circuitry is further configured to:

select a candidate object having center coordinates not located in the respective virtual plot from the plurality of objects in the respective virtual plot;

detect collision between the candidate object and a boundary corresponding to the respective virtual plot, and obtain a collision result; and select the candidate object as the object when the collision result indicates that the candidate object hits the boundary.

13. The apparatus according to claim 11, wherein the processing circuitry is further configured to:

determine a to-be-replaced portion of the object; and determine a replacement model portion corresponding to the to-be-replaced portion, simplify the collision body model of the object using the replacement model portion, and obtain the simplified model.

14. The apparatus according to claim 8, wherein the service device is a server connected to the terminal device, and the plural scene devices are servers each connected to the service device and configured to transmit a plot data file to the service device in response to a scene request received from the service device.

15. A non-transitory computer-readable storage medium storing computer-readable instructions thereon, which, when executed by processing circuitry, cause the processing circuitry to perform a method for processing a virtual scene, the method comprising:

segmenting the virtual scene into plural virtual plots, each of the plural virtual plots being a respective fixed plot area of the virtual scene;

allocating each of the plural virtual plots to a different one of plural scene devices in response to start-up messages transmitted by the plural scene devices;

transmitting a first loading message to two or more scene devices of the plural scene devices, the first loading message instructing the two or more scene devices to load in parallel, into respective memories of the two or more scene devices, plot data files of the plural virtual plots respectively allocated to each of the two or more scene devices; and transmitting loading configuration information to a service device configured to respond to operation requests from a terminal device displaying the virtual scene, the loading configuration information indicating which scene device of the plural scene devices is allocated to each virtual plot and enabling the service device to determine a scene device of the plural scene devices allocated to a virtual plot included in an operation request from the terminal device and transmit, based on the operation request, a scene request to the scene device allocated to the virtual plot included in the operation request.

16. The non-transitory computer-readable storage medium according to claim 15, wherein the method further comprises:

detecting that a scene device of the plural scene devices is disconnected;

transmitting a second loading message to a standby device according to a virtual plot of the plural virtual plots corresponding to the disconnected scene device, wherein the second loading message instructs the standby device to load a plot data file of the virtual plot corresponding to the disconnected scene device; and updating the loading configuration information when a loading success message is received from the standby device, and transmitting updated configuration information to the service device to determine the scene device allocated to the virtual plot included in the operation request from the terminal device.

17. The non-transitory computer-readable storage medium according to claim 15, the method further comprises:

determining an initial segmentation boundary of the virtual scene;

adjusting the initial segmentation boundary according to a safety distance, and obtaining a final segmentation boundary;

segmenting the virtual scene according to the final segmentation boundary, and obtaining the plurality of the virtual plots; and exporting a plot data file corresponding to each virtual plot, and respectively issuing the plot data file corresponding to each virtual plot to allocated scene devices.

18. The non-transitory computer-readable storage medium according to claim 17, wherein the exporting the plot data file comprises:

selecting an object from a plurality of objects in each respective virtual plot;

simplifying a collision body model of the object, and obtaining a simplified model; and exporting data of the simplified model of the object and collision body models of other objects of the plurality of objects as the plot data file corresponding to each respective virtual plot.

19. The non-transitory computer-readable storage medium according to claim 18, wherein the selecting the object comprises:

selecting a candidate object having center coordinates not located in the respective virtual plot from the plurality of objects in the respective virtual plot;

detecting collision between the candidate object and a boundary corresponding to the respective virtual plot, and obtaining a collision result; and selecting the candidate object as the object when the collision result indicates that the candidate object hits the boundary.

20. The non-transitory computer-readable storage medium according to claim 18, wherein the simplifying comprises:

determining a to-be-replaced portion of the object; and determining a replacement model portion corresponding to the to-be-replaced portion, simplifying the collision body model of the object using the replacement model portion, and obtaining the simplified model.

* * * * *